US010564723B2

(12) United States Patent
Kamata et al.

(10) Patent No.: US 10,564,723 B2
(45) Date of Patent: Feb. 18, 2020

(54) DRIVE CONTROLLING APPARATUS, ELECTRONIC DEVICE, COMPUTER-READABLE RECORDING MEDIUM, AND DRIVE CONTROLLING METHOD

(71) Applicant: FUJITSU LIMITED, Kawasaki-shi, Kanagawa (JP)

(72) Inventors: Yuichi Kamata, Isehara (JP); Yasuhiro Endo, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 248 days.

(21) Appl. No.: 15/644,259

(22) Filed: Jul. 7, 2017

(65) Prior Publication Data
US 2017/0308171 A1 Oct. 26, 2017

Related U.S. Application Data

(63) Continuation of application No. PCT/JP2015/051964, filed on Jan. 26, 2015.

(51) Int. Cl.
*G06F 3/045* (2006.01)
*G06F 3/01* (2006.01)
*G06F 3/044* (2006.01)

(52) U.S. Cl.
CPC .............. *G06F 3/016* (2013.01); *G06F 3/044* (2013.01)

(58) Field of Classification Search
CPC ................................. G06F 3/016; G06F 3/044
(Continued)

(56) References Cited

U.S. PATENT DOCUMENTS

2002/0149561 A1* 10/2002 Fukumoto .......... G01C 21/3664
345/156
2009/0284485 A1* 11/2009 Colgate ................... G06F 3/016
345/173
(Continued)

FOREIGN PATENT DOCUMENTS

JP 2006-163579 6/2006
JP 2010-231609 10/2010
(Continued)

OTHER PUBLICATIONS

Takeyuki Dohda et al., "The Printed-matter Typecasting Method for Haptic Feel Design and Sticky-band Illusion", The Collection of Papers of the 11th SICE System Integration Division Annual Conference (SI2010, Sendai), Dec. 2010, pp. 174 to 177 with English abstract.
(Continued)

*Primary Examiner* — Jonathan M Blancha
(74) *Attorney, Agent, or Firm* — Staas & Halsey LLP

(57) ABSTRACT

A drive controlling apparatus for driving a vibrating element of an electronic device, which includes, a coordinate detector that detects coordinates of a manipulation input performed on a manipulation input surface: a data storage part that stores basic waveform data representing a basic waveform representing a time change of amplitude of a driving signal for generating a natural vibration in the manipulation input surface, amplitude values arranged in a time series manner constituting the basic waveform; a waveform generating part that generates first waveform data representing a first waveform obtained by changing a basic frequency or the amplitude values; a waveform combining unit that generates first combined waveform data representing a first combined waveform by combining the basic waveform and the first waveform; and a drive controlling part that drives
(Continued)

the vibrating element by changing the amplitude of the driving signal based on the first combined waveform data.

16 Claims, 23 Drawing Sheets

(58) Field of Classification Search
USPC ........................................................ 345/174
See application file for complete search history.

(56) References Cited

U.S. PATENT DOCUMENTS

| | | |
|---|---|---|
| 2010/0231367 A1 | 9/2010 | Cruz-Hernandez et al. |
| 2010/0231508 A1 | 9/2010 | Cruz-Hernandez et al. |
| 2010/0231539 A1 | 9/2010 | Cruz-Hernandez et al. |
| 2010/0231540 A1 | 9/2010 | Cruz-Hernandez et al. |
| 2010/0231550 A1 | 9/2010 | Cruz-Hernandez et al. |
| 2011/0291976 A1 | 12/2011 | Takada et al. |
| 2013/0222339 A1 | 8/2013 | Koga |
| 2014/0184545 A1 | 7/2014 | Tanaka |
| 2016/0310844 A1* | 10/2016 | Yamashita .............. A63F 13/28 |

FOREIGN PATENT DOCUMENTS

| | | |
|---|---|---|
| JP | 2010-238222 | 10/2010 |
| JP | 2012-520519 | 9/2012 |
| JP | 2013-200863 | 10/2013 |
| JP | 2014-102648 | 6/2014 |
| JP | 2014-130443 | 7/2014 |

OTHER PUBLICATIONS

Masashi Nakatani et al., "The Fishbone Tactile Illusion", Collection of papers of the 10th Congress of the Virtual Reality Society of Japan, Sep. 2005, 5 pages.

International Search Report of Int. Appl. No. PCT/JP2015/051964 dated Apr. 7, 2015.

WIPO English Abstract for JP 2012-52019, published Sep. 6, 2012.

Espacenet English Abstract for JP 2010-231609, published Oct. 14, 2010.

Espacenet English Abstract for JP 2006-163579, published Jun. 22, 2006.

J-Plat Pat English Abstract for JP 2010-238222, published Oct. 21, 2010.

J-Plat Pat English Abstract for JP 2014-102648, published Jun. 15, 2014.

J-Plat Pat English Abstract for JP 2014-130443, published Oct. 7, 2014.

J-Plat Pat English Abstract for JP 2013-200863, published Oct. 3, 2013.

\* cited by examiner

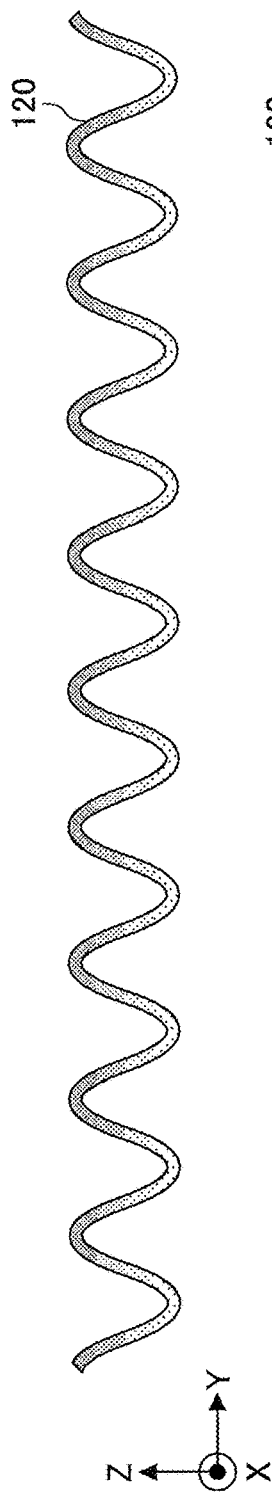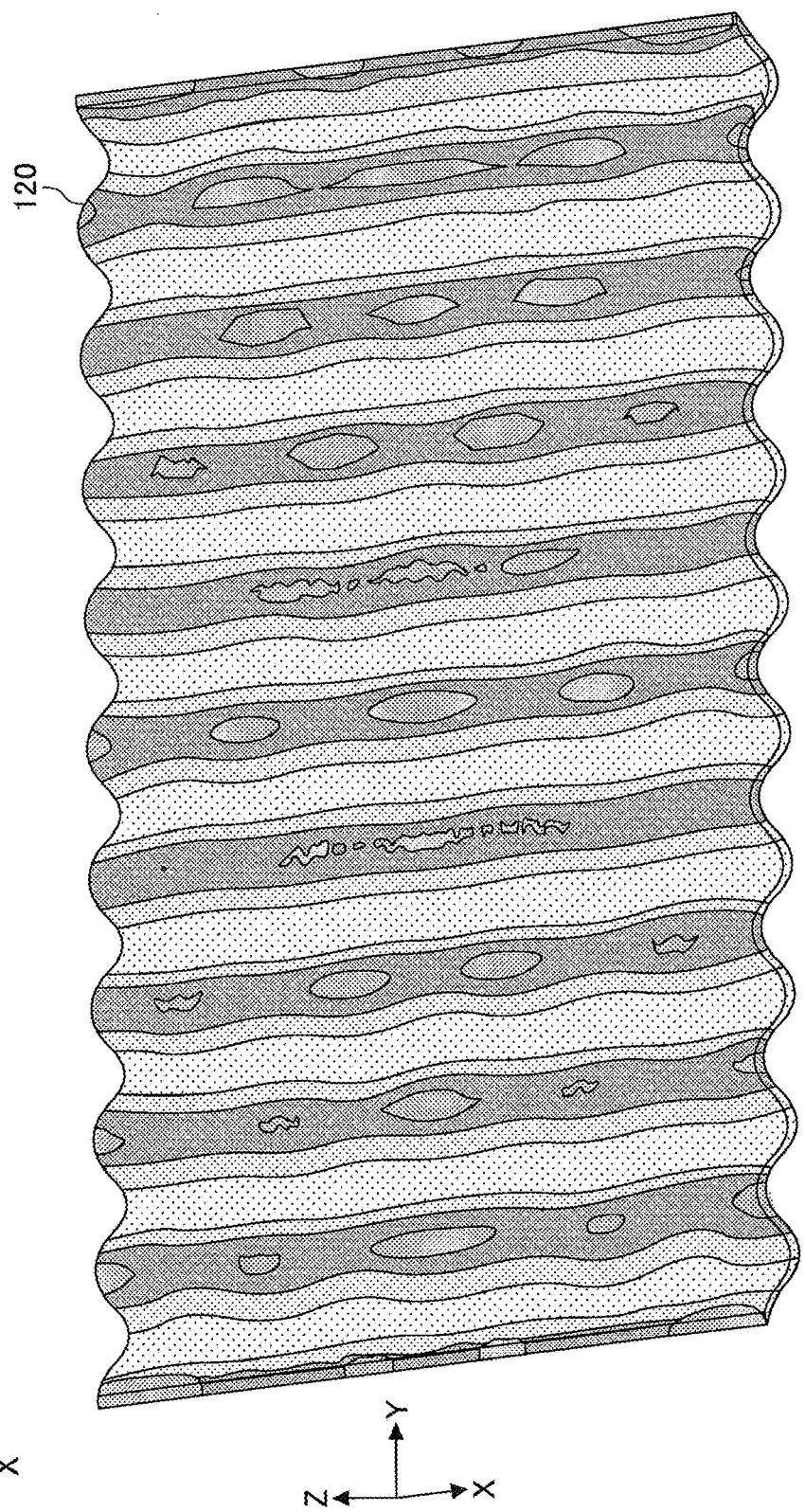
FIG.4A
FIG.4B

FIG.7

| APPLICATION ID | REGION DATA | VIBRATION PATTERN |
|---|---|---|
| app_id1 | f1=(X,Y) | P1 |
| app_id1 | f2=(X,Y) | P2 |
| app_id1 | f3=(X,Y) | P3 |
| app_id1 | f4=(X,Y) | P4 |
|  |  |  |

FIG.8

| BASIC WAVEFORM ID | WAVEFORM DATA STRING |
|---|---|
| fw_id1 | [a1, a2, a3,···, a3072] |
| fw_id2 | [b1, b2, b3,···, b3072] |
| fw_id3 | [c1, c2, c3,···, c1024] |
|  |  |

FIG.9

| VIBRATION PATTERN | BASIC WAVEFORM ID | COEFFICIENT MATRIX |
|---|---|---|
| P1 | fw_id1 | $\begin{bmatrix} a11 & a12 & 0 & 0 & 0 & 0 & 0 & 0 \\ a21 & a22 & a23 & a24 & 0 & 0 & 0 & 0 \\ a31 & a32 & a33 & a34 & a35 & a36 & a37 & a38 \end{bmatrix}$ |
| P2 | fw_id2 | $\begin{bmatrix} b11 & b12 & 0 & 0 & 0 & 0 & 0 & 0 \\ b21 & b22 & b23 & b24 & 0 & 0 & 0 & 0 \\ b31 & b32 & b33 & b34 & b35 & b36 & b37 & b38 \end{bmatrix}$ |
| P3 | fw_id1 | $\begin{bmatrix} c11 & 0 & 0 & 0 & 0 & 0 \\ c21 & c22 & c23 & 0 & 0 & 0 \\ c31 & c32 & c33 & c34 & c35 & c36 \end{bmatrix}$ |
| P4 | fw_id3 | $\begin{bmatrix} d11 & 0 & 0 & 0 & 0 & 0 \\ d21 & d22 & d23 & 0 & 0 & 0 \\ d31 & d32 & d33 & d34 & d35 & d36 \end{bmatrix}$ |

| BASIC WAVEFORM ID | WAVEFORM DATA STRING |
|---|---|
| fw_id21 | [a1, a2, a3, ⋯, a3072] |
|  | [α1, α2, α3, ⋯, α2048] |
|  |  |

FIG.24

| VIBRATION PATTERN | BASIC WAVEFORM ID | COEFFICIENT MATRIX |
|---|---|---|
| P1 | fw_id21 | $\begin{bmatrix} \alpha 11 & \alpha 12 & \alpha 13 \\ \alpha 21 & \alpha 22 & \alpha 23 \\ \alpha 31 & \alpha 32 & \alpha 33 \end{bmatrix} \begin{bmatrix} \alpha 11 & \alpha 12 & \alpha 13 \\ \alpha 21 & \alpha 22 & \alpha 23 \\ \alpha 31 & \alpha 32 & \alpha 33 \end{bmatrix} \begin{bmatrix} a11 & a12 & a13 & 0 & 0 & 0 & 0 & 0 \\ a21 & a22 & a23 & a24 & 0 & 0 & 0 & 0 \\ a31 & a32 & a33 & a34 & a35 & a36 & a37 & a38 \end{bmatrix} \begin{bmatrix} 0 & 0 & 0 & 0 & 0 & 0 & 0 & 0 \\ \alpha 25 & \alpha 26 & 0 & 0 & 0 & 0 & 0 & 0 \\ \alpha 34 & \alpha 35 & \alpha 36 & \alpha 37 & \alpha 38 & \alpha 39 & \alpha 310 & \alpha 311 & \alpha 312 \end{bmatrix}$ |
| | | |

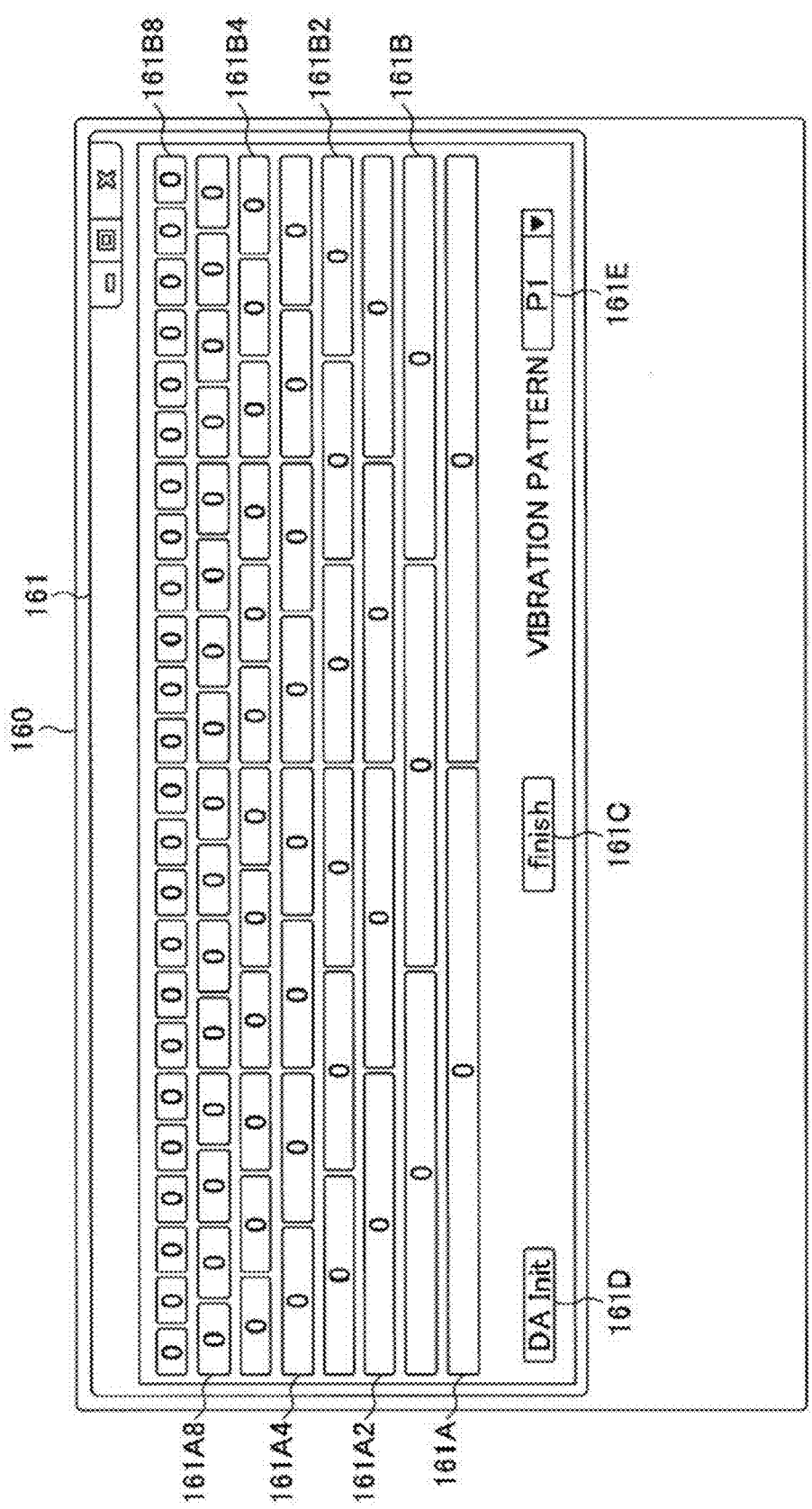

DRIVE CONTROLLING APPARATUS, ELECTRONIC DEVICE, COMPUTER-READABLE RECORDING MEDIUM, AND DRIVE CONTROLLING METHOD

CROSS-REFERENCE TO RELATED APPLICATION

This application is a continuation application of International Application PCT/JP2015/051964 filed on Jan. 26, 2015 and designated the U.S., the entire contents of which are incorporated herein by reference.

FIELD

The embodiments discussed herein relate to a drive controlling apparatus, an electronic device, a computer-readable recording medium, and a drive controlling method.

BACKGROUND

Conventionally, there has been a tactile sensation producing apparatus that includes a display means, a contact detecting means that detects a contact state of a user's manipulation region on the display means, and a tactile vibration generating means that generates tactile vibration that gives a predetermined tactile sensation to the user's manipulation region contacting the display means (for example, see Patent Document 1).

The tactile sensation producing apparatus further includes a vibration waveform data generating means that generates waveform data for generating the tactile vibration based on a detected result of the contact detecting means. Also, the tactile sensation producing apparatus further includes an ultrasound modulating means that performs a modulating process on the waveform data, generated by the vibration waveform data generating means, by utilizing ultrasound as a carrier wave and outputs an ultrasound modulation signal generated by the modulating process to the tactile vibration generating means as a signal for generating the tactile vibration.

Also, the ultrasound modulating means performs either a frequency modulation or a phase modulation. Also, the ultrasound modulating means further performs an amplitude modulation.

However, an ultrasound frequency used in the conventional tactile sensation producing apparatus may be any frequency as long as the frequency is higher than that of an audible frequency (approximately 20 kHz). No specific setting is made for the ultrasound frequency. Accordingly, there is a possibility that the tactile sensation producing apparatus does not provide a favorable tactile sensation.

RELATED-ART DOCUMENTS

Patent Documents

[Patent Document 1] Japanese Laid-open Patent Publication No. 2010-231609

SUMMARY

According to an aspect of the embodiments, a drive controlling apparatus drives a vibrating element of an electronic device. The electronic device includes a display part, a top panel disposed on a display surface side of the display part, the top panel having a manipulation input surface, a coordinate detector configured to detect coordinates of a manipulation input performed on the manipulation input surface, and the vibrating element, which is configured to vibrate the manipulation input surface. The drive controlling apparatus includes a data storage part configured to store basic waveform data that represents a basic waveform that represents a time change of amplitude of a driving signal for generating a natural vibration in an ultrasound frequency band in the manipulation input surface, a predetermined number of amplitude values arranged in a time series manner constituting the basic waveform; a waveform generating part configured to generate first waveform data that represents a first waveform obtained by changing a basic frequency or the amplitude values of the basic waveform; a waveform combining unit configured to generate first combined waveform data that represents a first combined waveform obtained by combining the basic waveform and the first waveform or by combining a plurality of first waveforms generated by the waveform generating part; and a drive controlling part configured to drive the vibrating element by changing the amplitude of the driving signal based on the first combined waveform data.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIGS. 4A and 4B are diagrams illustrating crests and troughs of a standing wave formed in parallel with a short side of a top panel included in standing waves generated in the top panel by a natural vibration in an ultrasound frequency band;

FIG. 7 is a diagram illustrating first data stored in a memory;

FIG. 8 is a diagram illustrating second data stored in the memory;

FIG. 9 is a diagram illustrating third data stored in the memory;

FIG. 24 is a diagram illustrating third data stored in the memory according to the second embodiment;

FIG. 25 is a diagram illustrating a state of a dialog box displayed on the display panel which dialog box is used when first frequency multiplying factors and amplitude multiplying coefficients are set;

DESCRIPTION OF EMBODIMENTS

Hereinafter, embodiments of the present invention will be described to which a drive controlling apparatus, an electronic device, a drive controlling program, and a drive controlling method are applied. An object in one aspect of the embodiments is to provide a drive controlling apparatus, an electronic device, a drive controlling program, and a drive controlling method that can provide favorable tactile sensations.

First Embodiment

Figure 1:
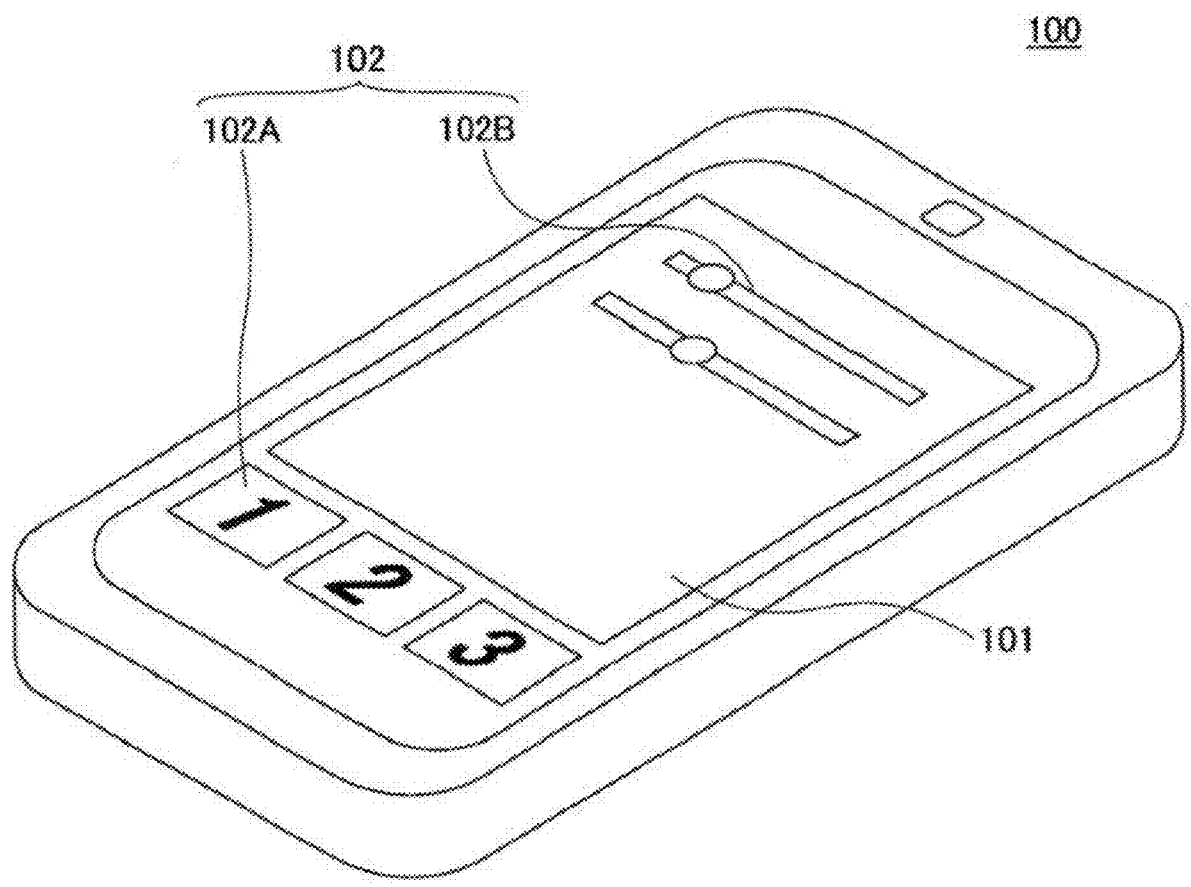
FIG. 1 is a perspective view illustrating an electronic device according to a first embodiment.

FIG. 1 is a perspective view illustrating an electronic device 100 according to a first embodiment.

For example, the electronic device 100 is a smartphone terminal device, a tablet computer, or a game machine that has a touch panel as a manipulation input part. The electronic device 100 may be any device as long as the device has a touch panel as a manipulation input part. Accordingly, the electronic device 100 may be a device such as a portable-type information terminal device, or an Automatic Teller Machine (ATM) placed at a specific location to be used, for example.

In a manipulation input part 101 of the electronic device 100, a display panel is disposed under a touch panel, and various buttons including a button 102A, a slider 102B and the like (hereinafter referred to as Graphic User Interface (GUI) manipulation part(s) 102) are displayed on the display panel.

A user of the electronic device 100 ordinarily touches the manipulation input part 101 by his or her fingertip(s) in order to manipulate the GUI manipulation part 102.

Next, a detailed configuration of the electronic device 100 will be described with reference to FIG. 2.

Figure 2:
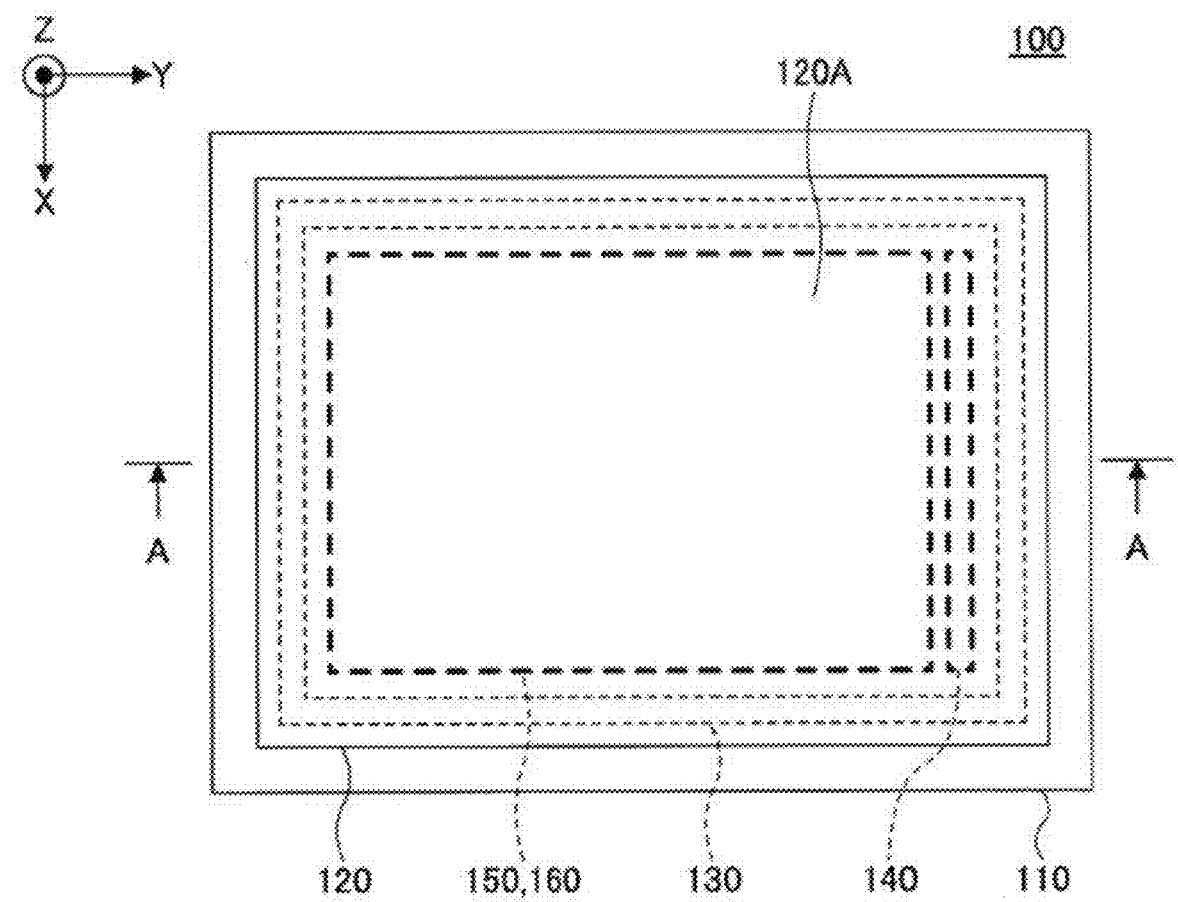
FIG. 2 is a plan view illustrating the electronic device according to the first embodiment.
Figure 3:
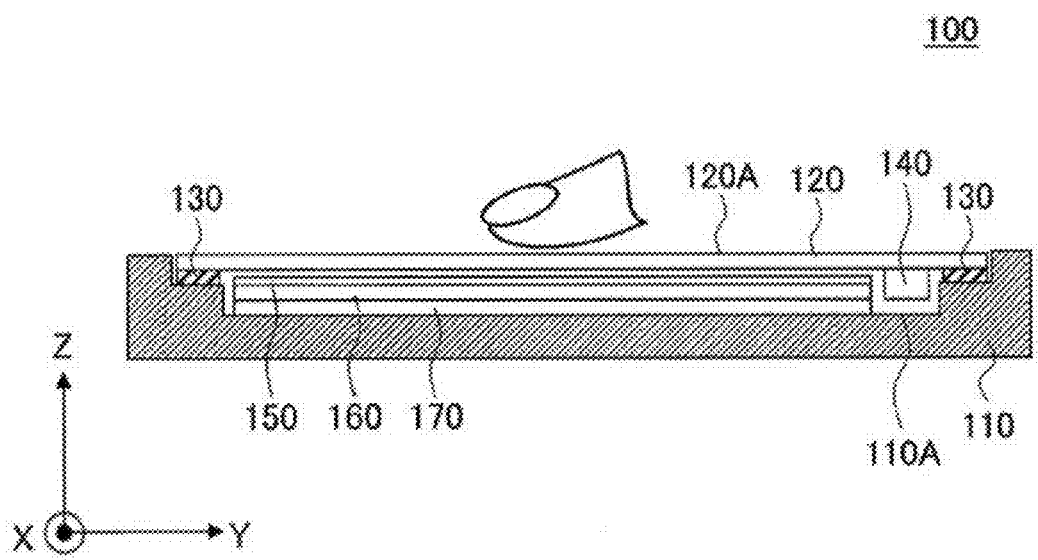
FIG. 3 is a cross-sectional view of the electronic device taken along a line A-A of FIG. 2.

FIG. 2 is a plan view illustrating the electronic device 100 of the first embodiment. FIG. 3 is a diagram illustrating a cross-sectional view of the electronic device 100 taken along a line A-A of FIG. 2. It should be noted that an XYZ coordinate system that is an orthogonal coordinate system is defined as illustrated in FIGS. 2 and 3.

The electronic device 100 includes a housing 110, the top panel 120, a double-faced adhesive tape 130, a vibrating element 140, the touch panel 150, the display panel 160, and a substrate 170.

The housing 110 is made of a plastic, for example. As illustrated in FIG. 3, the substrate 170, the display panel 160 and the touch panel 150 are disposed in a recessed portion 110A of the housing 110, and the top panel 120 is bonded on the housing 110 by the double-faced adhesive tape 130.

The top panel 120 is a thin flat-plate member having a rectangular shape in plan view, and is made of transparent glass or a reinforced plastic such as polycarbonate. A surface of the top panel 120 (a positive side surface in the Z axis direction) is one example of a manipulation input surface on which the user of the electronic device 100 performs a manipulation input.

The vibrating element 140 is bonded on a negative side surface of the top panel 120 in the Z axis direction, and the four sides in plan view of the top panel 120 are bonded on the housing 110 by the double-faced adhesive tape 130. It should be noted that the double-faced adhesive tape 130 is not necessarily a rectangular-ring-shaped member in plan view as illustrated in FIG. 3, as long as the double-faced adhesive tape 130 can bond the four sides of the top panel 120 to the housing 110.

The touch panel 150 is disposed on the negative side in the Z axis direction of the top panel 120. The top panel 120 is provided in order to protect the surface of the touch panel 150. It should be noted that another panel, protection film or the like may be provided on the surface 120A of the top panel 120.

In a state in which the vibrating element 140 is bonded on the negative side surface of the top panel 120 in the Z axis direction, the top panel 120 is vibrated by driving the vibrating element 140. In the first embodiment, a standing wave is generated in the top panel 120 by causing the top panel 120 to vibrate at a natural vibration frequency of the top panel 120. However, because the vibrating element 140 is bonded to the top panel 120, it is preferable to determine the natural vibration frequency in consideration of a weight of the vibrating element 140 and the like, in practice.

The vibrating element 140 is bonded on the negative side surface of the top panel 120 in the Z axis direction, at a positive side in the Y axis direction, along the short side extending in the X axis direction. The vibrating element 140 may be any element as long as it can generate vibration in an ultrasound frequency band. A piezoelectric element such as a piezo element may be used as the vibrating element 140, for example.

The vibrating element 140 is driven in accordance with a driving signal output from a drive controlling part which will be described later. A frequency and an amplitude (intensity) of the vibration generated by the vibrating element 140 are set by the driving signal. Further, on/off of the vibrating element 140 is controlled in accordance with the driving signal.

It should be noted that the ultrasound frequency band is a frequency band that is higher than or equal to approximately 20 kHz, for example. According to the electronic device 100 of the first embodiment, the frequency at which the vibrating element 140 vibrates is equal to a number of vibrations per unit time (frequency) of the top panel 120. Accordingly, the vibrating element 140 is driven in accordance with the driving signal so that the vibrating element 140 vibrates at a number of natural vibrations per unit time (natural vibration frequency) of the top panel 120.

The touch panel 150 is disposed on (the positive side in the Z axis direction of) the display panel 160 and is disposed under (the negative side in the Z axis direction of) the top panel 120. The touch panel 150 is one example of a coordinate detector that detects a position (in the following, the position is referred to as a position of the manipulation input) at which the user of the electronic device 100 touches the top panel 120.

Various Graphic User Interface (GUI) buttons or the like (hereinafter referred to as GUI manipulation part(s)) are displayed on the display panel 160 located under the touch panel 150. Therefore, the user of the electronic device 100 ordinarily touches the top panel 120 by his or her fingertip(s) in order to manipulate the GUI manipulation part.

The touch panel 150 is any coordinate detector as long as it can detect the position of the manipulation input on the top panel 120 performed by the user. The touch panel 150 may be a capacitance type coordinate detector or a resistance film type coordinate detector, for example. Here, the embodiment in which the touch panel 150 is a capacitance type coordinate detector will be described. The capacitance type touch panel 150 can detect the manipulation input performed on the top panel 120 even if there is a clearance gap between the touch panel 150 and the top panel 120.

Also, although the top panel 120 is disposed on the input surface side of the touch panel 150 in the described embodiment, the top panel 120 may be integrated with the touch panel 150. In this case, the surface of the touch panel 150 is equal to the surface 120A of the top panel 120 illustrated in FIGS. 2 and 3, and the surface of the touch panel 150 constitutes the manipulation input surface. The top panel 120 illustrated in FIGS. 2 and 3 may be omitted. In this case, the surface of the touch panel 150 constitutes the manipulation input surface. In this case, a member having the manipulation input surface may be vibrated at a natural vibration frequency of the member.

In a case where the touch panel 150 is of capacitance type, the touch panel 150 may be disposed on the top panel 120. In this case also, the surface of the touch panel 150 constitutes the manipulation input surface. Also, in the case where the touch panel 150 is of capacitance type, the top panel 120 illustrated in FIGS. 2 and 3 may be omitted. In this case also, the surface of the touch panel 150 constitutes the manipulation input surface. In this case, a member having the manipulation input surface may be vibrated at a natural vibration frequency of the member.

The display panel 160 may be a display part that can display an image. The display panel 160 may be a liquid crystal display panel, an organic Electroluminescence (EL) panel or the like, for example. Inside the recessed portion 110A of the housing 110, the display panel 160 is arranged on (the positive side in the Z axis direction of) the substrate 170 using a holder or the like whose illustration is omitted.

The display panel 160 is driven and controlled by a driver Integrated Circuit (IC), which will be described later, and displays a GUI manipulation part, an image, characters, symbols, graphics, and/or the like in accordance with an operating state of the electronic device 100.

The substrate 170 is disposed inside the recessed portion 110A of the housing 110. The display panel 160 and the touch panel 150 are disposed on the substrate 170. The display panel 160 and the touch panel 150 are fixed to the substrate 170 and the housing 110 by a holder or the like (not shown).

On the substrate 170, a drive controlling apparatus, which will be described later, and circuits and the like that are necessary for driving the electronic device 100 are mounted.

According to the electronic device 100 having the configuration as described above, when the user touches the top panel 120 with his or her fingertip and a movement of the user's fingertip is detected, the drive controlling part mounted on the substrate 170 drives the vibrating element 140 to vibrate the top panel 120 at a frequency in the ultrasound frequency band. This frequency in the ultrasound frequency band is a resonance frequency of a resonance system including the top panel 120 and the vibrating element 140 and generates a standing wave in the top panel 120.

The electronic device 100 generates the standing waves in the ultrasound frequency band to provide tactile sensations to the user through the top panel 120.

Next, the standing wave generated in the top panel 120 will be described with reference to FIGS. 4A and 4B.

FIGS. 4A and 4B are diagrams illustrating crests formed parallel with the short side of the top panel 120 included in the standing waves generated in the top panel 120 by the natural vibration in the ultrasound frequency band. FIG. 4A is a side view, and FIG. 4B is a perspective view. In FIGS. 4A and 4B, an XYZ coordinate system similar to that of FIGS. 2 and 3 is defined. It should be noted that in FIGS. 4A and 4B, the amplitude of the standing wave is overdrawn in an easy-to-understand manner. Also, the vibrating element 140 is omitted in FIGS. 4A and 4B.

The natural vibration frequency (the resonance frequency) f of the top panel 120 is represented by the following formulas (1) and (2) where E is the Young's modulus of the top panel 120, $\rho$ is the density of the top panel 120, $\delta$ is the Poisson's ratio of the top panel 120, l is the long side dimension of the top panel 120, t is the thickness of the top panel 120, and k is a periodic number of the standing wave along the direction of the long side of the top panel 120. Because the standing wave has the same waveform in every half cycle, the periodic number k takes values at intervals of 0.5, therefore at 0.5, 1, 1.5, 2 . . . .

$$f = \frac{\pi k^2 t}{l^2} \sqrt{\frac{E}{3\rho(1-\delta^2)}} \qquad (1)$$

$$f = \alpha k^2 \qquad (2)$$

It should be noted that the coefficient α included in formula (2) corresponds to coefficients other than $k^2$ included in formula (1).

A waveform of the standing wave illustrated in FIGS. 4A and 4B is a waveform of a case where the periodic number k is 10, for example. In a case where a sheet of Gorilla (registered trademark) glass of which the length l of the long side is 140 mm, the length of the short side is 80 mm, and the thickness t is 0.7 mm is used as the top panel 120, for example, the natural vibration frequency f is 33.5 kHz when the periodic number k is 10. In this case, a driving signal whose frequency is 33.5 kHz may be used.

The top panel 120 is a planar member. When the vibrating element 140 (see FIGS. 2 and 3) is driven to generate the natural vibration in the ultrasound frequency band in the top panel 120, the top panel 120 deflects as illustrated in FIGS. 4A and 4B. As a result, the standing wave is generated in the surface 120A of the top panel 120.

In the described embodiment, the single vibrating element 140 is bonded, on the negative side surface of the top panel 120 in the Z axis direction, at the location along the short side, which extends in the X axis direction, at the positive side in the Y axis direction. However, the electronic device 100 may use two vibrating elements 140. In a case where the electronic device 100 uses the two vibrating elements 140, another vibrating element 140 may be bonded, on the negative side surface of the top panel 120 in the Z axis direction, at a location along the short side, which extends in the X axis direction, at a negative side in the Y axis direction. In this case, the two vibrating elements 140 may be axisymmetrically disposed with respect to a center line of the top panel 120 parallel to the two short sides of the top panel 120.

Further, in a case where the electronic device 100 drives two vibrating elements 140, the two vibrating elements 140 may be driven in the same phase, if the periodic number k is an integer number. If the periodic number k is a decimal number (which is a number having an integer part and a decimal part), the two vibrating elements 140 may be driven in opposite phases.

Next, the natural vibration in the ultrasound frequency band generated in the top panel 120 of the electronic device 100 will be described with reference to FIGS. 5A and 5B.

Figure 5A:
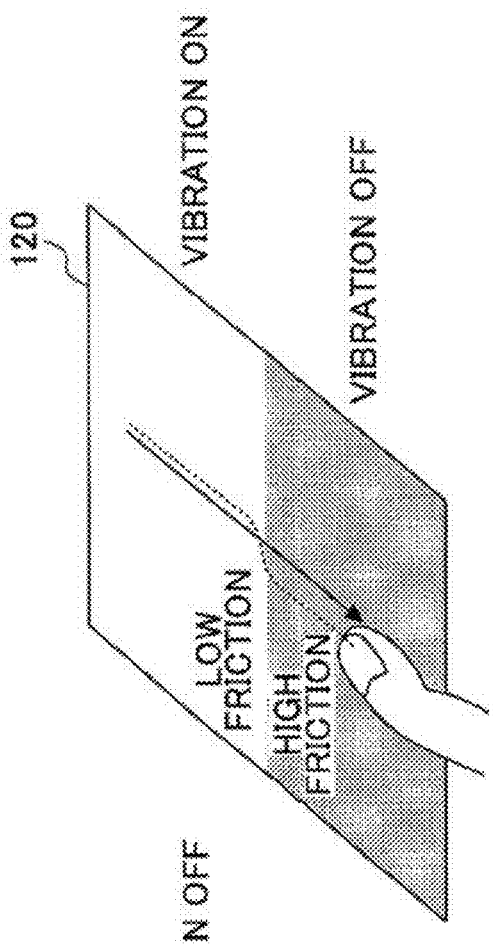
FIGS. 5A and 5B are diagrams illustrating cases where a kinetic friction force applied to a user's fingertip performing a manipulation input is varied by the natural vibration in the ultrasound frequency band generated in the top panel of the electronic device.
Figure 5B:
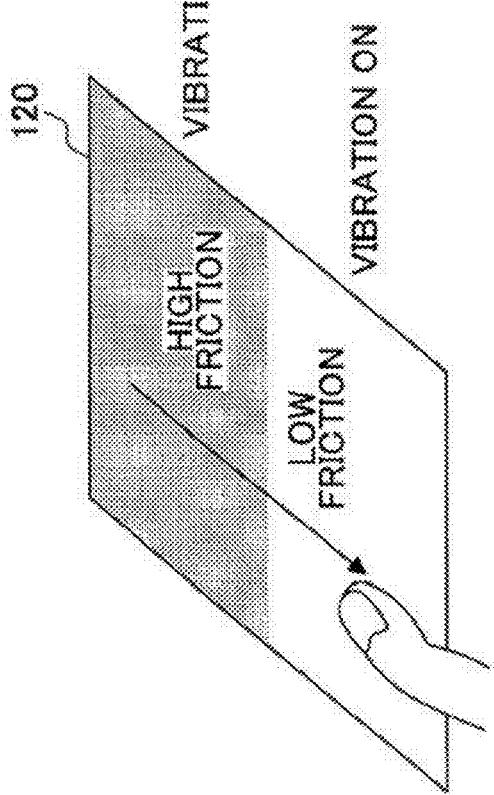

FIGS. 5A and 5B are diagrams illustrating cases where a kinetic friction force applied to a user's fingertip performing a manipulation input is varied by the natural vibration in the ultrasound frequency band generated in the top panel 120 of the electronic device 100. In FIGS. 5A and 5B, while touching the top panel 120 with the user's fingertip, the user performs the manipulation input by moving his or her fingertip along the arrow from a far side to a near side of the top panel 120. It should be noted that the vibration is turned on/off by turning on/off the vibrating element 140 (see FIGS. 2 and 3).

In FIGS. 5A and 5B, areas which the user's fingertip touches while the vibration is off are indicated in grey, with respect to the depth direction of the top panel 120. Areas which the user's finger touches while the vibration is on are indicated in white, with respect to the depth direction of the top panel 120.

As illustrated in FIGS. 4A and 4B, the natural vibration in the ultrasound frequency band occurs in the entire top panel 120. FIGS. 5A and 5B illustrate operation patterns in which on/off of the vibration is switched while the user's finger is tracing the top panel 120 from the far side to the near side. Accordingly, in FIGS. 5A and 5B, the areas which the user's finger touches while the vibration is off are indicated in grey, and the areas which the user's finger touches while the vibration is on are indicated in white.

In the operation pattern illustrated in FIG. 5A, the vibration is off when the user's finger is located on the far side of the top panel 120, and the vibration is turned on in the process of moving the user's finger toward the near side.

Conversely, in the operation pattern illustrated in FIG. 5B, the vibration is on when the user's finger is located on the far side of the top panel 120, and the vibration is turned off in the process of moving the user's finger toward the near side.

Here, when the natural vibration in the ultrasound frequency band is generated in the top panel 120, a layer of air is interposed between the surface 120A of the top panel 120 and the user's finger. The layer of air is provided by a squeeze film effect. Thus, a kinetic friction coefficient on the surface of the top panel 120 is decreased when the user traces the surface with the user's finger.

Accordingly, in the grey area located on the far side of the top panel 120 illustrated in FIG. 5A, the kinetic friction force applied to the user's fingertip increases. In the white area located on the near side of the top panel 120, the kinetic friction force applied to the user's fingertip decreases.

Therefore, a user who is performing the manipulation input on the top panel 120 as illustrated in FIG. 5A senses a decrease of the kinetic friction force applied to the user's fingertip when the vibration is turned on. As a result, the user senses a slippery or smooth touch (texture) with the user's fingertip. In this case, the user senses as if a concave portion were present on the surface 120A of the top panel 120, when the surface 120A of the top panel 120 becomes smoother and the kinetic friction force decreases.

Conversely, in the white area located on the far side of the top panel 120 illustrated in FIG. 5B, the kinetic friction force applied to the user's fingertip decreases. In the grey area located on the near side of the top panel 120, the kinetic friction force applied to the user's fingertip increases.

Therefore, a user who is performing the manipulation input on the top panel 120 as illustrated in FIG. 5B senses an increase of the kinetic friction force applied to the user's fingertip when the vibration is turned off. As a result, the user senses a grippy or scratchy touch (texture) with the user's fingertip. In this case, the user senses as if a convex portion were present on the surface 120A of the top panel 120, when the surface of the top panel 120 becomes grippy and the kinetic friction force increases.

As described above, the user can feel a concavity and convexity with his or her fingertip in the cases as illustrated in FIGS. 5A and 5B. For example, "The Printed-matter Typecasting Method for Haptic Feel Design and Sticky-band Illusion" (the Collection of papers of the 11th SICE system integration division annual conference (SI2010, Sendai)_174-177, 2010-12) discloses that a person can sense a concavity or a convexity. "Fishbone Tactile Illusion" (Collection of papers of the 10th Congress of the Virtual Reality Society of Japan (September, 2005)) also discloses that a person can sense a concavity or a convexity.

Although a variation of the kinetic friction force when the vibration is switched on/off is described above, a variation of the kinetic friction force is similarly obtained when the amplitude (intensity) of the vibrating element 140 is varied.

Next, a configuration of the electronic device 100 of the first embodiment will be described with reference to FIG. 6.

Figure 6:
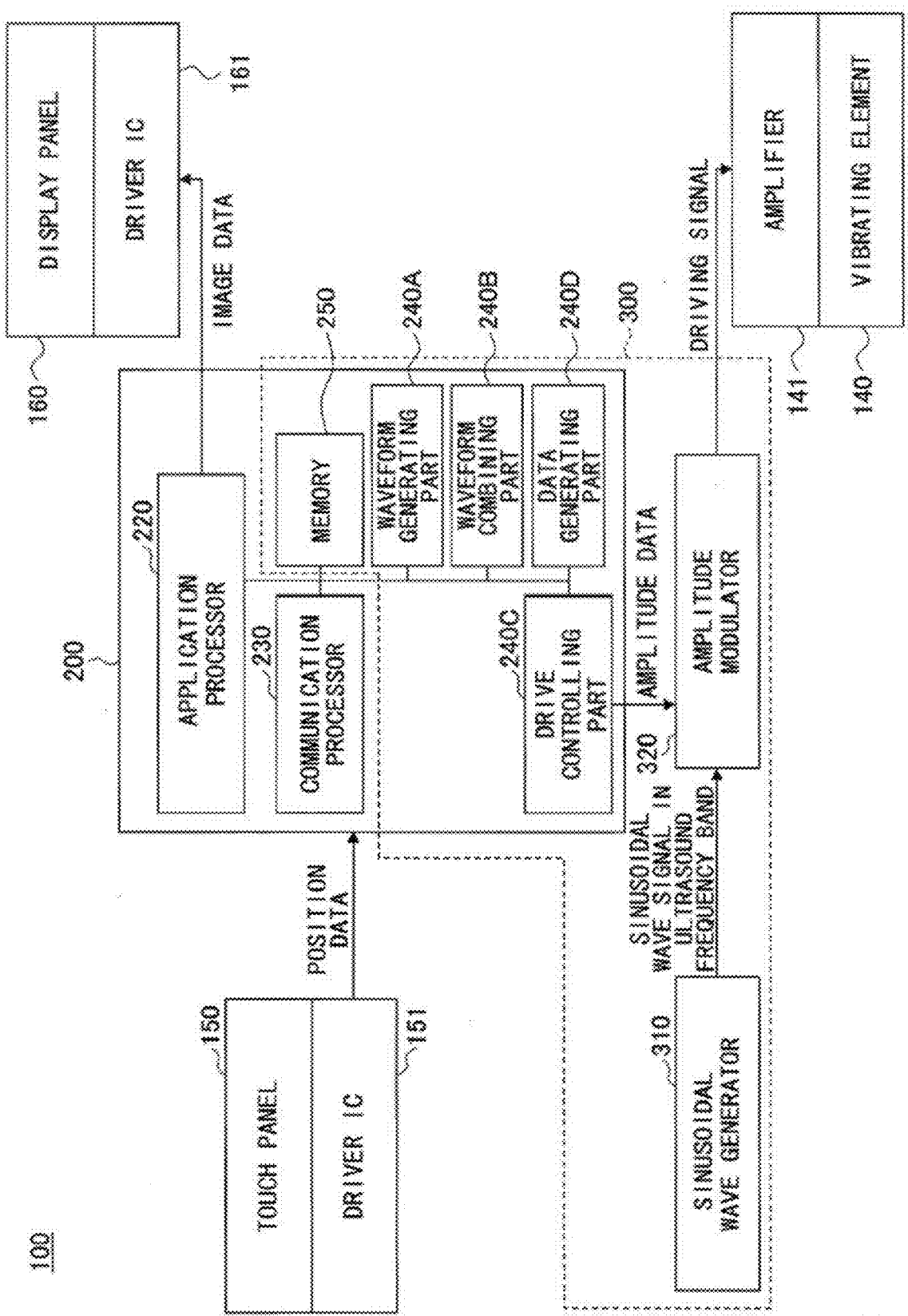
FIG. 6 is a diagram illustrating a configuration of the electronic device according to the first embodiment.

FIG. 6 is a diagram illustrating the configuration of the electronic device 100 of the first embodiment.

The electronic device 100 includes the vibrating element 140, an amplifier 141, the touch panel 150, a driver Integrated Circuit (IC) 151, the display panel 160, a driver IC 161, a controlling part 200, a sinusoidal wave generator 310, and an amplitude modulator 320.

The controlling part 200 includes an application processor 220, a communication processor 230, a waveform generating part 240A, a waveform combining part 240B, a drive controlling part 240C, a data generating part 240D, and a memory 250. The controlling part 200 is realized by an IC chip, for example.

The waveform generating part 240A, the waveform combining part 240B, the drive controlling part 240C, the data generating part 240D, the memory 250, the sinusoidal wave generator 310, and the amplitude modulator 320 constitute a drive controlling apparatus 300. Here, although the application processor 220, the communication processor 230, the waveform generating part 240A, the waveform combining part 240B, the drive controlling part 240C, the data generating part 240D, and the memory 250 are realized by one controlling part 200 in the described embodiment, the waveform generating part 240A, the waveform combining part 240B, the drive controlling part 240C, and the data generating part 240D may be disposed outside the controlling part 200 as another IC chip or processor.

In this case, data that is necessary for drive control of the drive controlling part 240C among data stored in the memory 250, may be stored in a memory other than the memory 250 and may be provided inside the drive controlling apparatus 300. The waveform generating part 240A, the waveform combining part 240B, the drive controlling part 240C, and the data generating part 240D may be realized by different IC chips or processors. Two or three of the waveform generating part 240A, the waveform combining part 240B, the drive controlling part 240C, and the data generating part 240D may be realized by the same IC chip or processor.

In FIG. 6, the housing 110, the top panel 120, the double-faced adhesive tape 130, and the substrate 170 (see FIG. 2) are omitted. Here, the amplifier 141, the driver IC 151, the driver IC 161, the application processor 220, the communication processor 230, the waveform generating part 240A, the waveform combining part 240B, the drive controlling part 240C, the data generating part 240D, the memory 250, the sinusoidal wave generator 310, and the amplitude modulator 320 will be described.

The amplifier 141 is disposed between the drive controlling apparatus 300 and the vibrating element 140. The amplifier 141 amplifies the driving signal output from the drive controlling apparatus 300 to drive the vibrating element 140.

The driver IC 151 is coupled to the touch panel 150. The driver IC 151 detects position data that represents a position on the touch panel 150 at which a manipulation input is performed, and outputs the position data to the controlling part 200. As a result, the position data is input to the application processor 220, the drive controlling part 240C, and the data generating part 240D. Note that inputting the position data to the drive controlling part 240C is equivalent to inputting the position data to the drive controlling apparatus 300.

Further, when detecting the position data, the driver IC 151 outputs area data to the drive controlling part 240C. The area data represents an area (touch area) of the user's fingertip touching the surface 120A of the top panel 120 by a manipulation input. The touch area changes in accordance with a contact load of the manipulation input.

The contact load of the manipulation input is a load applied to the top panel 120 when the user's fingertip presses the surface 120A. As the force of the user's fingertip pressing the top panel 120 increases, the contact load increases and the deformation amount of the user's fingertip increases and therefore, the touch area increases. In contrast, as the force of the user's fingertip pressing the top panel 120 decreases, the contact load decreases and the deformation amount of the user's fingertip decreases and therefore, the touch area decreases.

In a case where the touch panel 150 is of a capacitance type, an electrostatic capacitance may be detected by the driver IC 151 to detect the touch area. As the touch area increases, the electrostatic capacitance increases. As the touch area decreases, the electrostatic capacitance decreases. In a case where the touch panel 150 is of a resistance film type, a resistance value may be detected by the driver IC 151 to detect the touch area. As the touch area increases, the resistance value decreases. As the touch area decreases, the resistance value increases.

The driver IC 161 is coupled to the display panel 160. The driver IC 161 inputs image data, output from the drive controlling apparatus 300, to the display panel 160 and causes the display panel 160 to display an image that is based on the image data. In this way, a GUI manipulation part, an image, or the like based on the image data is displayed on the display panel 160.

The application processor 220 performs processing of executing various applications of the electronic device 100.

The communication processor 230 executes necessary processing so that the electronic device 100 performs communications such as 3G (Generation), 4G (Generation), LTE (Long Term Evolution), and WiFi.

In a case where two predetermined conditions are satisfied, the waveform generating part 240A generates first waveform data that represents one or more first waveforms obtained by changing a frequency or an amplitude of a basic waveform represented by basic waveform data stored in the memory 250. Note that the two predetermined conditions will be described later below.

The basic waveform data is data that represents the basic waveform. The basic waveform is a waveform used in order to time-sequentially change an amplitude of a driving signal for generating, in the surface 120A (manipulation input surface) of the top panel 120, a natural vibration in the ultrasound frequency band. The basic waveform is represented by an envelope constituted by a predetermined number of amplitude values arrayed in a time series manner. The basic waveform data is structured by basic amplitude values arrayed in a time series manner. The basic amplitude values represent the predetermined number of amplitude values constituting the envelope of the basic waveform.

In a case of generating first waveform data having a first frequency that is higher than a frequency (basic frequency) of the basic waveform data, the waveform generating part 240A decreases the number of data points to generate the first waveform data by thinning out the basic waveform data in accordance with a ratio (first frequency multiplying factor) of the first frequency to the basic frequency.

Intervals between the plurality of basic amplitude values in the time axis direction included in the basic waveform data are equal to intervals of the plurality of first amplitude values in the time axis direction included in the first waveform data generated by reducing the number of data points.

Hence, decreasing the number of data points as described above is equal to generating the first waveform data obtained by increasing the frequency of the basic waveform data in accordance with the first frequency multiplying factor.

That is, the first waveform, which is represented by the first waveform data generated by decimating the basic waveform data to decrease the number of data points, is a waveform in which the basic waveform is shortened in accordance with the first frequency multiplying factor in the time axis direction.

The first waveform is represented by the envelope structured by the predetermined number of amplitude values arrayed in a time series manner. The first waveform data is structured by the predetermined number of first amplitude values, which are arrayed in the time series manner and constitute the envelope of the first waveform. The number of data points of the first amplitude values is less than the number of data points of the basic amplitude values in accordance with the first frequency multiplying factor.

In a case of changing the amplitude values of the basic waveform data, the waveform generating part 240A multiplies the basic amplitude values by a predetermined coefficient (amplitude multiplying coefficient). In a case of generating first waveform data obtained by changing the amplitude values of the basic waveform data and by changing the frequency to be a first frequency that is higher than the basic frequency, the waveform generating part 240A generates the first waveform data by multiplying the amplitude values by the amplitude multiplying coefficient and by decimating the basic waveform data to decrease the number of data points in accordance with the first frequency multiplying factor.

In this case, the first waveform becomes a waveform that is obtained by multiplying the amplitude values by the amplitude multiplying coefficient and by shortening the basic waveform in accordance with the first frequency multiplying factor in the time axis direction.

Note that the basic waveform and the first waveform will be described later below with reference to FIG. 7 to FIG. 9.

The waveform combining part 240B generates first combined waveform data that represents a first combined waveform obtained by combining the basic waveform and the first waveform or represents a first combined waveform obtained by combining the plurality of first waveforms. The waveforms are combined by combining, while adjusting their time-sequential positions, the plurality of basic amplitude values, which represent the amplitude values included in the basic waveform, and the plurality of first amplitude values, which represent the amplitude values included in the first waveform.

That is, by combining the basic amplitude values and the first amplitude values of which the time-sequential positions are equal to those of the basic amplitude values, the first combined waveform data structured by first combined amplitude values is generated. The basic amplitude values and the first amplitude values are combined by adding the amplitude values to each other. Hence, the first combined amplitude values are given as sums of the basic amplitude values and the first amplitude values.

Because the first combined waveform data is obtained as described above, the first combined waveform is represented by an envelope obtained by combining the envelope that represents the basic waveform and the envelope that represents the first waveform.

In a case where the plurality of first waveforms are combined, data of the plurality of first amplitude values may be combined while adjusting their time-sequential positions.

Note that in a case where both the first frequency multiplying factor and the amplitude multiplying coefficient are "1", the generated first waveform has the same waveform as the basic waveform. Combining such a first waveform with a first waveform obtained by changing the frequency or the amplitude vales of a basic waveform can be treated as combining two first waveforms and can also be treated as combining a basic waveform with a first waveform.

The first combined waveform data is used in order to generate second combined waveform data and third combined waveform data that will be described later below. The second combined waveform data and the third combined waveform data are waveform data that represents a time change of amplitude values for modulating the intensity (amplitude) of a driving signal used to drive the vibrating element 140. Thus, the first combined waveform data is data used to time-sequentially change the amplitude of the driving signal. Note that the first combined waveform will be described later below with reference to FIG. 10.

When the two predetermined conditions are satisfied, the drive controlling part 240C generates the third combined waveform data based on the first combined waveform data to output, to the amplitude modulator 320, the third combined waveform data as amplitude data. The third combined waveform data is waveform data that represents a time change of amplitude values for modulating the intensity (amplitude) of the driving signal used to drive the vibrating element 140.

Further, when the two predetermined conditions are satisfied, the drive controlling part 240C outputs position data to the waveform generating part 240A.

The second combined waveform data is generated by decimating the first combined waveform data to reduce the number of data points in accordance with a degree of time change of a position of a manipulation input. Then, the third combined waveform data is generated by changing the amplitude values of the second combined waveform data in accordance with a contact load of the manipulation input.

Here, intervals in the time axis direction between the plurality of first combined amplitude values included in the first combined waveform data and intervals between the plurality of second combined amplitude values included in the second combined waveform data generated by decimating the number of data points are made equal.

Hence, decreasing the number of data points as described above is equal to generating the second combined waveform data obtained by increasing the frequency of the first combined waveform data in accordance with the degree of time change.

Hence, the third combined waveform data is generated by generating the second combined waveform data, which is generated by increasing the frequency of the first combined waveform data in accordance with the degree of time change of the position of the manipulation input, and by changing the amplitude values of the second combined waveform data in accordance with the contact load of the manipulation input.

As describe above, when the two predetermined conditions are satisfied, the drive controlling part 240C outputs position data to the waveform generating part 240A.

As described above, the required duration of time from a point of time when position data is input to the waveform generating part 240A to a point of time when a driving signal is calculated by the drive controlling part 240C based on the position data is $\Delta t$. That is, during the required duration $\Delta t$ of time, the waveform generating part 240A uses the position data obtained from the drive controlling part 240C to generate the first waveform data, the waveform combining part 240B combines the plurality of first waveforms to generate the first waveform data, and the drive controlling part 240C finally generates the amplitude data based on the first combined waveform data.

Note that the position data may be directly input to the waveform generating part 240A from the driver IC 151, and the waveform generating part 240A may generate the first waveform data by using the input position data.

The data generating part 240D generates first data and third data in accordance with a content of a manipulation input by a user. In addition to the first data and the third data, the data generating part 240D may generate second data. The first data, the second data, and the third data may be stored in the memory 250. The first data, the second data, and the third data will be described later below with reference to FIG. 7 to FIG. 9.

Here, before describing processing of generating the third combined waveform data, processing will be described that is executed by the drive controlling part 240C apart from the processing of generating the third combined waveform data.

A moving speed of a user's fingertip moving along the surface 120A of the top panel 120 is used as a degree of time change of position data used for the first predetermined condition of the two predetermined conditions. The drive controlling part 240C calculates the moving speed of the user's fingertip based on a degree of time change of the position data input from the driver IC 151.

The drive controlling apparatus 300 of the first embodiment causes the top panel 120 to vibrate in order to vary the kinetic friction force applied to the user's fingertip when the user's fingertip traces along the surface 120A of the top panel 120. Because the kinetic friction force occurs when the user's fingertip is in motion, the drive controlling part 240C causes the vibrating element 140 to vibrate when the moving speed becomes greater than or equal to a predetermined threshold speed. The first predetermined condition is satisfied in a case where the moving speed is greater than or equal to the predetermined threshold speed.

Accordingly, the amplitude value represented by the amplitude data output from the drive controlling part 240C is zero in a case where the moving speed is less than the predetermined threshold speed. The amplitude value is set to be a predetermined amplitude value corresponding to the moving speed in a case where the moving speed becomes greater than or equal to the predetermined threshold speed.

Note that the threshold speed may preferably be set to be the minimum speed of the moving speed of the user's fingertip for when the user performs the manipulation input while moving the user's fingertip touching the surface 120A of the top panel 120. Such a minimum speed may be set based on an experimental result, a resolution of the touch panel 150, or the like.

The drive controlling apparatus 300 of the first embodiment outputs the amplitude data to the amplitude modulator 320 in a case where the position of the user's fingertip performing the manipulation input is within a predetermined region in which a vibration is to be generated. The second predetermined condition is satisfied in a case where the position of the user's fingertip performing the manipulation input is within the predetermined region in which the vibration is to be generated.

The drive controlling apparatus 300 determines whether the position of the user's fingertip performing the manipulation input is within the predetermined region, in which a vibration is to be generated, based on whether the position of the user's fingertip performing the manipulation input is located inside the predetermined region in which the vibration is to be generated.

Here, a position of a GUI manipulation part displayed on the display panel 160, of a region for displaying an image, of a region representing an entire page, or the like on the display panel 160 is specified by region data that represents the region. The region data is provided, in all applications, with respect to all GUI manipulation parts to be displayed on the display panel 160, the region for displaying an image, or the region representing the entire page.

Accordingly, in a case where the drive controlling apparatus 300 determines, as the second predetermined condition, whether the position of the user's fingertip performing the manipulation input is within the predetermined region in which a vibration is to be generated, a type of the application (s) activated by the electronic device 100 is of concern to the determination. This is because contents displayed on the display panel 160 differ depending on the types of the applications.

Further, this is because types of the manipulation inputs of moving the user's fingertip(s) touching the surface 120A of the top panel 120 differ depending on the types of the applications. For example, there is a flick operation as a type of a manipulation input performed by moving the user's fingertip(s) touching the surface 120A of the top panel 120 when manipulating a GUI manipulation part. The flick operation is an operation performed by moving the user's fingertip for a relatively short distance to flick (snap) the surface 120A of the top panel 120.

In a case where the user turns over or flips a page, a swipe operation is performed, for example. The swipe operation is an operation performed by moving the user's fingertip for a relatively long distance to swipe the surface 120A of the top panel 120. The swipe operation is performed when the user flips a page or a photo, for example. Further, in a case of sliding the slider of the GUI manipulation part (see the slider 102B in FIG. 1), a drag operation is performed to drag the slider.

The manipulation inputs that are performed by moving the user's fingertip(s) touching the surface 120A of the top panel 120, such as the flick operation, the swipe operation and the drag operation that are introduced as examples, are used differently depending on types of displayed contents by the applications. Accordingly, the type of the application executed by the electronic device 100 is related to determining whether the position of the user's fingertip performing the manipulation input is within the predetermined region in which a vibration is to be generated.

The drive controlling part 240C uses the region data to determine whether the position represented by the position data input from the driver IC 151 is within the predetermined region in which a vibration is to be generated.

The memory 250 stores the first data that associates data, which represents the types of the applications, with the region data, which represents the regions of the GUI input parts or the like in which a manipulation input is to be performed, and with pattern data, which represents vibration patterns.

Here, the vibration pattern is a pattern of an envelope of time change of an ultrasound vibration generated in the top panel 120 by modulating, based on the amplitude data output from the drive controlling part 240C, the amplitude of the sinusoidal wave signal in the ultrasound frequency band output from the sinusoidal wave generator 310. This vibration pattern is a pattern of vibration that can be actually sensed by the user through his or her fingertip(s). For example, the frequency of a vibration according to the vibration pattern is set to be less than or equal to 1 kHz, in order to be in a frequency band sensed by a human's fingertip(s).

The drive controlling part 240C performs the following processes in order to interpolate a positional change of the position of the user's fingertip during the required duration of time from a point of time when the position data is input to the drive controlling apparatus 300 from the driver IC 151 to a point of time when the driving signal is calculated based on the position data.

The drive controlling apparatus 300 performs calculation for each predetermined control cycle. Similarly, the drive controlling part 240C also performs calculation for each predetermined control cycle. Hence, when the required duration of time, from the point of time when position data is input from the driver IC 151 to the drive controlling apparatus 300 to the point of time when the driving signal is calculated by the drive controlling part 240C based on the position data, is $\Delta t$, the required duration $\Delta t$ of time is equal to the control cycle.

Here, the moving speed of the user's fingertip can be calculated as a velocity of a vector that has a starting point (x1, y1) represented by the position data input to the drive controlling apparatus 300 from the driver IC 151 and a terminal point (x2, y2) corresponding to the position of the user's fingertip after an elapse of the required duration $\Delta t$ of time.

The drive controlling part 240C estimates coordinates (x3, y3) after the elapse of the required duration $\Delta t$ of time by calculating a vector having a starting point (x1, y1) represented by the position data input to the drive controlling apparatus 300 from the driver IC 151 and a terminal point (x2, y2) corresponding to the position of the user's fingertip after the elapse of the required duration $\Delta t$ of time.

The electronic device 100 of the first embodiment interpolates the positional change of the position of the user's fingertip having arisen in the required duration $\Delta t$ of time by estimating coordinates after the elapse of the required duration $\Delta t$ of time as described above.

The drive controlling part 240C performs such calculation of estimating the coordinates after the elapase of the required duration $\Delta t$ of time. The drive controlling part 240C determines whether the estimated coordinates are within the predetermined region in which a vibration is to be generated and generates the vibration when the estimated coordinates are within the predetermined region. Accordingly, the second predetermined condition is that the estimated coordinates are within the predetermined region in which a vibration is to be generated.

As described above, the two predetermined conditions required for the drive controlling part 240C to output the amplitude data to the amplitude modulator 320 are that the moving speed of the user's fingertip is greater than or equal to the predetermined threshold speed and that the estimated coordinates are located in the predetermined region in which a vibration is to be generated.

In a case where the moving speed of the user's fingertip is greater than or equal to the predetermined threshold speed and the estimated coordinates are located inside the predetermined region in which the vibration is to be generated, the drive controlling part 240C generates the third combined waveform data to output the combined waveform data as the amplitude data to the amplitude modulator 320.

Next, the processing of generating the third combined waveform data that is executed by the drive controlling part 240C will be described.

According to the first embodiment, the drive controlling part 240C performs processing as follows when decimating the first combined waveform data to decrease the number of data points in accordance with the degree of time change.

Here, v is the moving speed of the manipulation input, and $v_0$ is a reference speed. The reference speed $v_0$ may be a known speed that can be used as a reference of the moving speed v of the manipulation input. For example, the above described threshold speed may be used as the reference speed $v_0$.

Further, Int($\gamma$) represents a function converting a value of $\gamma$ into an integer number, and, for example, derives the integer value by rounding down its decimal places or by standard rounding to the nearest integer.

The drive controlling part 240C uses the following formulas (3), (4), and (5) to obtain the speed ratio $\gamma$, the frequency shift amount $s_f$ and the second frequency multiplying factor $a_f$ from the moving speed v.

$$\gamma = \log_2 \frac{v}{v_0} \quad (3)$$

$$s_f = \text{Int}\left(\log_2 \frac{v}{v_0}\right) \quad (4)$$

$$a_f = 2^{s_f} \quad (5)$$

The formula (3) is a formula for obtaining the ratio of the moving speed v of the manipulation input with respect to the reference speed $v_0$, in a logarithmic value. The formula (4) is a formula for obtaining the frequency shift amount $s_f$ by converting the ratio obtained by the formula (3) into an integer. Hence, the integer obtained by the formula (4) represents the ratio of the moving speed v of the manipulation input with respect to the reference speed $v_0$ as an integer. The formula (5) is a formula for obtaining the second frequency multiplying factor $a_f$ as a value of $2^{s_f}$.

The drive controlling part 240C generates the second combined waveform data having the number of data points obtained by dividing the number of data points of the first combined amplitude values included in the first combined waveform data by $a_f$. That is, the drive controlling part 240C extracts values from the first combined amplitude values by skipping every ($a_f$−1) values in the first time axis direction such that the number of data points in the second combined waveform data is $1/a_f$ of the number of data points of the first combined waveform data.

Making the number of data points 1/a by skipping every ($a_f$−1) values to extract the values from the first combined amplitude values is equal to decreasing the number of data points by decimating the first combined amplitude values in accordance with the value of the second frequency multiplying factor $a_f$, and is equal to generating the second combined waveform data having the frequency obtained by multiplying the frequency of the first combined waveform by the second frequency multiplying factor $a_f$.

In this way, the second combined amplitude values are generated from the first combined amplitude values.

As described above, the drive controlling part 240C generates the second combined waveform data from the first combined waveform data.

Note that the second combined waveform data is output, from the drive controlling part 240C to the amplitude modulator 320, as the amplitude data to be used to modulate the amplitude of the sinusoidal wave signal in the ultrasound frequency band to be output from the sinusoidal wave generator 310.

In order to make the frequency band that can be sensed by a person's fingertip(s), it is preferable that the vibration of the second combined waveform is set such that the frequency band of the second combined waveform is less than or equal to 1 kHz. Thus, for example, it is preferable that the frequency of the basic waveform is set to be a frequency lower than or equal to 1 kHz in consideration of the first frequency multiplying factor and the second frequency multiplying factor $a_f$.

Note that although the second frequency multiplying factor $a_f$ is obtained as a value of $2^{sf}$ in the formulas (3), (4), and (5), a natural number greater than 2 or a decimal number (which is a number having an integer part and a decimal part) greater than 1 may be used. That is, the formula (5) may be $a_f = m^n$ as a general formula. Here, m is a natural number greater than or equal to 2 or a decimal number greater than 1, and n is a natural number greater than or equal to 0 and represents a ratio of the moving speed v of the manipulation input to the reference speed $v_0$. In a case where the value of m is a decimal number, the number of data points of the first combined waveform may be set to be an integer value that is exactly divisible by $m^n$. When the value of m is a decimal number, in a case where a first combined amplitude value of the last data point of the first combined waveform data is not zero, processing for setting it to be zero may be performed.

Further, according to the first embodiment, the drive controlling part 240C performs processing as follows, when changing, in accordance with the contact load of the manipulation input, the amplitude values of the driving signal, given by the second combined waveform data, to generate the third combined waveform data. Here, the drive controlling part 240C obtains the contact load of the manipulation input based on the touch area represented by the area data input to the drive controlling part 240C from the driver IC 151.

The drive controlling part 240C obtains the amplitude multiplying factor $a_a$ from the contact load based on the following formula (6), and outputs, to the amplitude modulator 320, the third combined waveform data as the amplitude data obtained by multiplying the second combined amplitude values included in the second combined waveform data by the amplitude multiplying factor $a_a$.

Here, w represents the contact load, and $w_{max}$ represents the value of the contact load of outputting the maximum amplitude.

$$a_a = \begin{cases} \sqrt[3]{\dfrac{w}{w_{max}}} & (w \leq w_{max}) \\ 1 & (w > w_{max}) \end{cases} \quad (6)$$

As described above, the drive controlling part 240C generates the third combined waveform data by multiplying the amplitude values of the second combined waveform data by the amplitude multiplying factor $a_a$.

The memory 250 stores the first data, the second data, and the third data. The first data, the second data, and the third data will be described later below with reference to FIG. 7 to FIG. 9.

Further, the memory 250 stores programs and data necessary for the application processor 220 to execute the applications, and stores programs and data necessary for communicating processing of the communication processor 230, and the like. The memory 250 is an example of a data storage part.

The sinusoidal wave generator 310 generates sinusoidal waves required for generating the driving signal that is for vibrating the top panel 120 at the natural vibration frequency. For example, in a case of causing the top panel 120 to vibrate at the natural vibration frequency f of 33.5 kHz a frequency of the sinusoidal waves becomes 33.5 kHz. The sinusoidal wave generator 310 inputs a sinusoidal wave signal in the ultrasound frequency band to the amplitude modulator 320. The sinusoidal wave, which the sinusoidal wave generator 310 outputs, is a driving signal before the amplitude is modulated, and is a sinusoidal wave of generating, in the manipulation input surface, the natural vibration in the ultrasound frequency band at constant frequency and a constant phase.

Using the amplitude data input from the drive controlling part 240C, the amplitude modulator 320 modulates an amplitude of the sinusoidal wave signal, input from the sinusoidal wave generator 310, to generate a driving signal. This driving signal has a predetermined vibration pattern. The amplitude modulator 320 modulates only the amplitude of the sinusoidal wave signal in the ultrasound frequency band, input from the sinusoidal wave generator 310, to generate the driving signal having the predetermined vibration pattern without modulating a frequency and a phase of the sinusoidal wave signal.

The driving signal output from the amplitude modulator 320 is a sinusoidal wave signal in the ultrasound frequency band obtained by modulating only the amplitude of the sinusoidal wave signal in the ultrasound frequency band input from the sinusoidal wave generator 310. The pattern with modulating the amplitude represents the predetermined vibration pattern. It should be noted that in a case where the amplitude data is zero, the amplitude of the driving signal is zero. This is the same as the amplitude modulator 320 not outputting the driving signal.

Next, the first data, the second data, the third data stored in the memory 250 will be described with reference to FIG. 7 to FIG. 9.

FIG. 7 is a diagram illustrating the first data stored in the memory 250.

The first data is data that represents an application Identification (ID) representing the type of an application, with region data representing coordinate values of regions where a GUI manipulation part or the like on which a manipulation input is to be performed is displayed and with pattern data representing vibration patterns.

FIG. 7 illustrates app_id1 as the application ID. Further, FIG. 7 illustrates formulas f1 to f4 as the region data, representing coordinate values of regions where a GUI manipulation part or the like, on which a manipulation input is to be performed, is displayed. Further, FIG. 7 illustrates P1 to P4 as the pattern data, representing vibration patterns.

Note that the applications represented by the application IDs included in the first data include various applications that can be used in a smartphone terminal device, a tablet computer, a game machine, or the like. The applications include an email-edit mode.

FIG. 8 is a diagram illustrating the second data stored in the memory 250.

The second data is data that associates basic waveform identifications (IDs) representing types of basic waveforms with waveform data strings. The waveform data strings are basic waveform data.

FIG. 8 illustrates fw_id1 to fw_id3 as the basic waveform IDs. Further, FIG. 8 illustrates [a1, a2, a3, . . . , and a3072], [b1, b2, b3, . . . , and b3072], and [c1, c2, c3, . . . , and c1024] as the waveform data strings.

The waveform data string [a1, a2, a3, . . . , and a3072] includes 3072 basic amplitude values a1 to a3072. The waveform data string [b1, b2, b3, . . . , and b3072] includes 3072 basic amplitude values b1 to b3072. The waveform data string [c1, c2, c3, . . . , and c1024] includes 1024 basic amplitude values c1 to c1024.

The waveform data strings [a1, a2, a3, . . . , and a3072], [b1, b2, b3, . . . , and b3072], and [c1, c2, c3, . . . , and c1024] represent envelopes structured by the basic amplitude values a1 to a3072, b1 to b3072, and c1 to c1024 that represent envelopes, respectively. The three envelopes represent the basic waveforms whose basic waveform IDs are fw_id1 to fw_id3.

FIG. 9 is a diagram illustrating the third data stored in the memory 250.

The third data is data that associates the vibration patterns with the basic waveform IDs and coefficient matrices. FIG. 9 illustrates P1 to P4 as the pattern data representing the vibration patterns. FIG. 9 illustrates fw_id1 to fw_id3 as the basic waveform IDs. Further, FIG. 9 illustrates, as the coefficient matrices, four matrices as illustrated. Note that the vibration patterns in FIG. 9 are the same as those illustrated in FIG. 7, and the basic waveform IDs in FIG. 9 are the same as those illustrated in FIG. 8.

In FIG. 9, for example, a coefficient matrix is data in a format of a 3-by-8 matrix or a 3-by-6 matrix. The coefficient matrix includes information that represents the ratios (first frequency multiplying factors) of the first frequencies to the basic frequency, the periodic numbers of the first waveform, and the multiplying factors (amplitude multiplying coefficients) of the amplitude values of the first waveform with respect to the amplitude values of the basic waveform.

The multiplying factor of the first frequency to the basic frequency is represented by a row number of the coefficient matrix. The multiplying factor at the uppermost row of the coefficient matrix is 1-fold, the multiplying factor at the second uppermost row is 2-fold, and the multiplying factor at the third uppermost row is 4-fold.

The periodic number of the first waveform is represented by a column number of the coefficient matrix. In FIG. 9, the 3-by-8 matrix can define a first waveform of eight periods at maximum, and the 3-by-6 matrix can define a first waveform of six periods at maximum.

The multiplying factor (amplitude multiplying coefficient) of the amplitude values of the first waveform with respect to the amplitude values of the basic waveform is a coefficient to be multiplied with the basic amplitude values when first waveform data is generated by changing the amplitude values of the basic waveform data. The amplitude multiplying coefficients are represented by the components included in the coefficient matrices.

In FIG. 9, the coefficient matrix associated with the vibration pattern P1 and the basic waveform ID fw_id1 includes a11, a12, 0, 0, 0, 0, 0, and 0 as amplitude multiplying coefficients whose first frequency multiplying factor is 1-fold. Further, the coefficient matrix includes a21, a22, a23, a24, 0, 0, 0, and 0 as amplitude multiplying coefficients whose first frequency multiplying factor is 2-fold. Furthermore, the coefficient matrix includes a31, a32, a33, a34, a35, a36, a37, and a38 as amplitude multiplying coefficients whose first frequency multiplying factor is 4-fold.

This means that in a case where the first frequency multiplying factor is 1-fold, a first waveform having a first frequency obtained by multiplying the basic frequency by 1 and having first amplitude values obtained by multiplying the amplitude values of the basic waveform by a11 and a12 in the first period and the second period respectively is generated. Further, because the coefficients for the third period to the eighth period are all 0, the first amplitude values are set to be 0. That is, this means that the first waveform is not generated for the third period to the eighth period.

Further, in a case where the first frequency multiplying factor is 2-fold, a first waveform having a first frequency obtained by multiplying the basic frequency by 2 and having first amplitude values obtained by multiplying the amplitude values of the basic waveform by a21, a22, a23, and a24 in the first period to the fourth period respectively is generated. Further, because the coefficients for the fifth period to the eighth period are all 0, the first amplitude values are set to be 0. That is, this means that the first waveform is not generated for the fifth period to the eighth period.

Further, in a case where the first frequency multiplying factor is 4-fold, a first waveform having a first frequency obtained by multiplying the basic frequency by 4 and having first amplitude values obtained by multiplying the amplitude values of the basic waveform by a31, a32, a33, a34, a35, a36, a37, and a38 in the first period to the eighth period respectively is generated.

Note that although the 3-by-8 and 3-by-6 coefficient matrices have been described, the number of rows of the coefficient matrix may be any number greater than or equal to 1 row, and the number of columns of the coefficient matrix may be any number greater than or equal to 1 column. The multiplying factor of the first frequency represented by a row number of the coefficient matrix is 1-fold at the uppermost row, and is $2^\beta$-fold at a β-th row where β is a row number greater than or equal to 2.

Next, waveforms of the basic waveform, the first waveforms, and the first combined waveform, the first frequency multiplying factors and the amplitude multiplying coefficient included in the coefficient matrix will be described with reference to FIG. 10 to FIG. 13.

Figure 10:
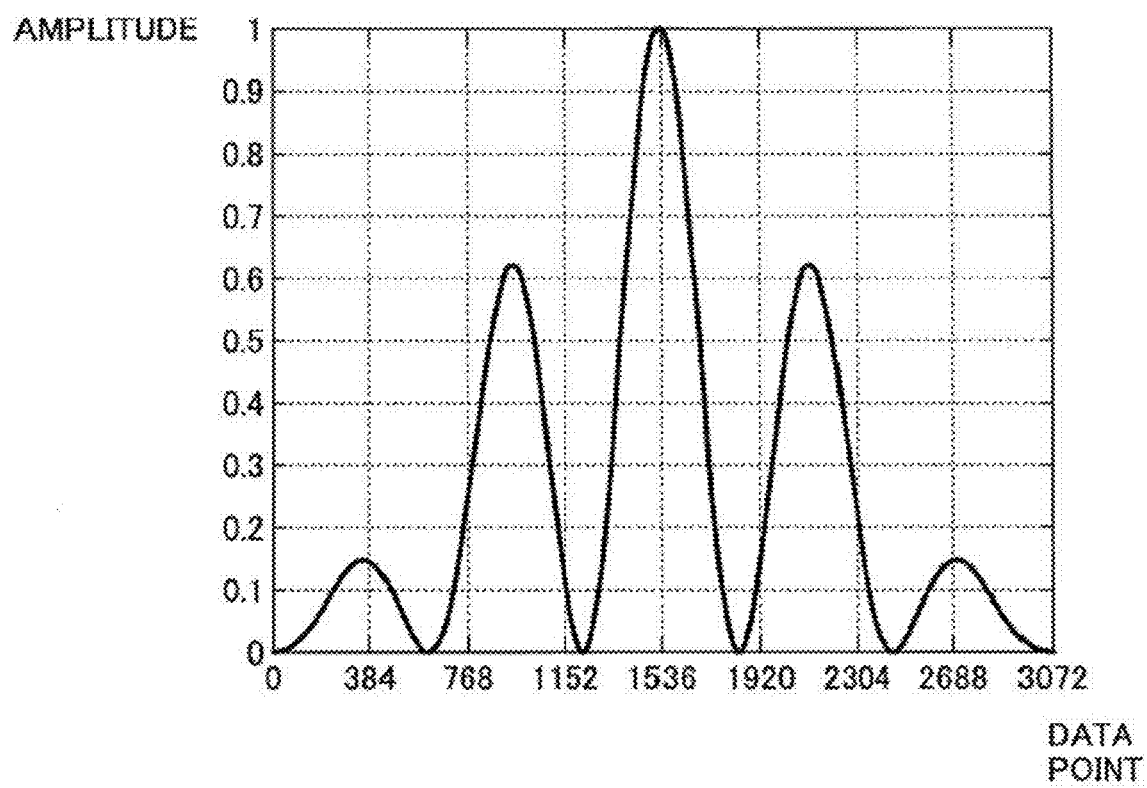
FIG. 10 is a diagram illustrating a basic waveform.

FIG. 10 is a diagram illustrating a basic waveform. The basic waveform, illustrated as an example in FIG. 10, is given as an envelope structured with 3072 basic amplitude values. The amplitude values have five peaks, and the 1536-th amplitude value is the maximum. The basic amplitude values representing such amplitudes may be set by the waveform data string illustrated in FIG. 8.

Figure 11:
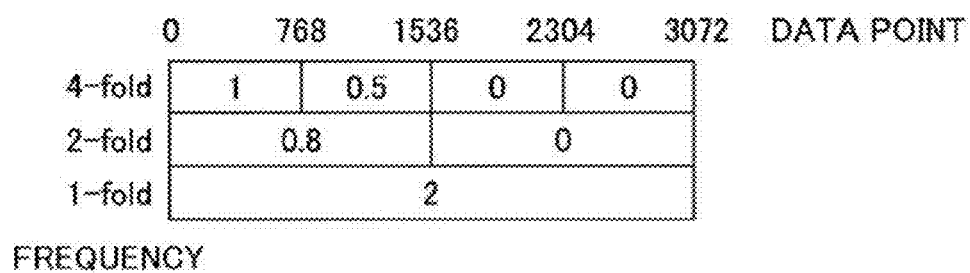
FIG. 11 is a diagram illustrating, in a table format, first frequency multiplying factors and amplitude multiplying coefficients included in a coefficient matrix.

FIG. 11 is a diagram illustrating, in a table format, the first frequency multiplying factors and the amplitude multiplying coefficients included in the coefficient matrix. The first frequency multiplying factors and the amplitude multiplying coefficients illustrated in FIG. 11 are structured to be applied to the basic waveform illustrated in FIG. 10.

In the table illustrated in FIG. 11, the first frequency multiplying factors are indicated by 1-fold, 2-fold, and 4-fold so that the factor increases from the bottom row toward the top row. A range of data points are illustrated in the horizontal direction of the table.

Each row of the table illustrated in FIG. 11 is divided into a number of columns equal to the periodic number of the first waveform or the basic waveform included in 3072 data points. Thus, the row at which the first frequency multiplying factor is 1-fold is divided into one column, the row at which the first frequency multiplying factor is 2-fold is divided into two columns, and the row at which the first frequency multiplying factor is 4-fold is divided into four columns.

The numerical values described in the table illustrated in FIG. 11 represent the amplitude multiplying coefficients. For example, because the amplitude multiplying coefficient for the row at which the first frequency multiplying factor is one-fold is "2", the 3072 first amplitude values become values obtained by doubling the 3072 basic amplitude values respectively.

For the row at which the first frequency multiplying factor is 2-fold, the amplitude multiplying coefficient is "0.8" for the data points of from 1 to 1536 and is "0" for the data points of from 1537 to 3072. Thus, for the data points of from 1 to 1536, the first waveform having the first frequency that is the double of the basic frequency and having amplitude values obtained by multiplying those of the basic waveform by 0.8 is obtained. Note that the first amplitude values of this first waveform are obtained by extracting values from the 3072 basic amplitude values alternately (extracts one for every two values) and to multiply the extracted values by 0.8. Note that for the data points of from 1537 to 3072, the first waveform is not generated because the first amplitude values of the first waveform are 0.

For the row at which the first frequency multiplying factor is 4-fold, the amplitude multiplying coefficient is "1" for the data points of from 1 to 768, is "0.5" for the data points of from 769 to 1536, and is "0" for the data points of from 1537 to 3072.

Thus, for the data points of from 1 to 768, the first waveform having the first frequency that is 4-fold of the basic frequency and having the amplitude values obtained by multiplying those of the basic waveform by 1 is obtained. For the data points of from 769 to 1536, the first waveform having the first frequency that is 4-fold of the basic frequency and having the amplitude values obtained by multiplying those of the basic waveform by 0.5 is obtained.

Note that the first amplitude values of this first waveform are obtained by extracting the values from the 3072 basic amplitude values by skipping every 3 values (by extracting one from every four values of the 3072 values) to multiply the extracted amplitude values by 1 or by 0.5. Note that for the data points of from 1537 to 3072, the first waveform is not generated because the first amplitude values of the first waveform are 0.

Figure 12:
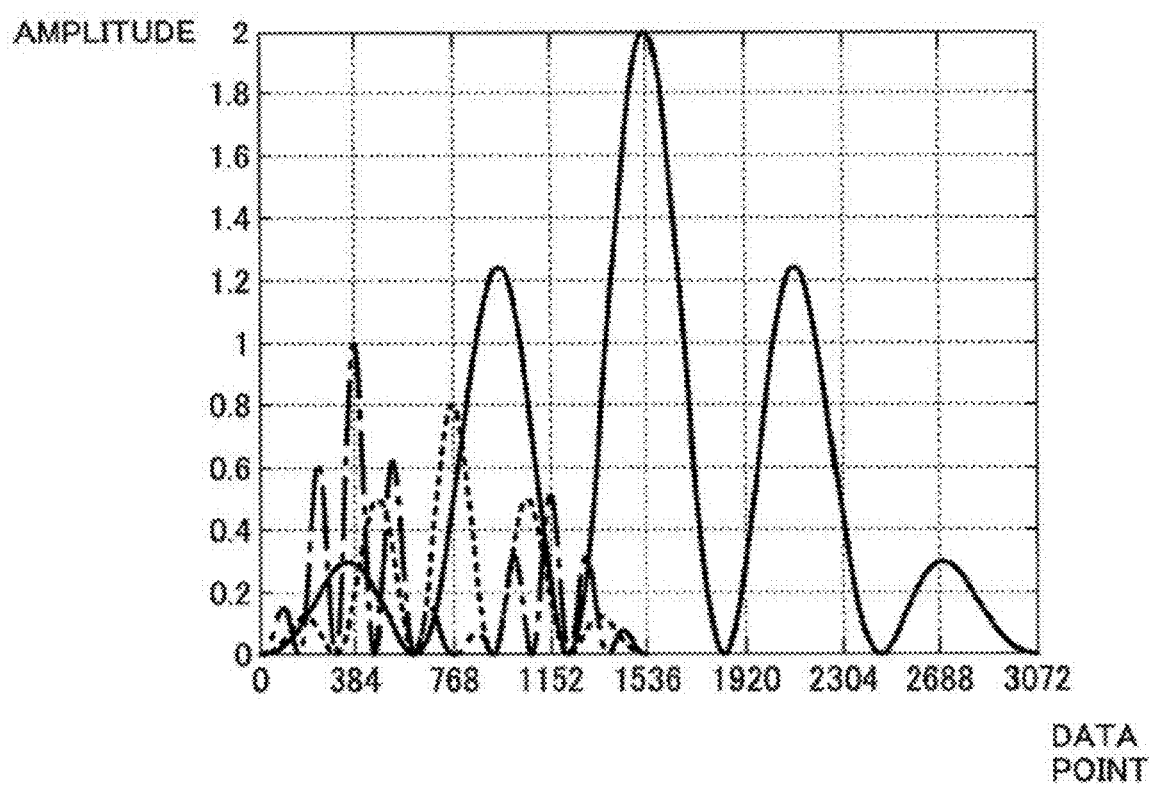
FIG. 12 is a diagram illustrating, in an overlapping manner, the basic waveform illustrated in FIG. 10 and three first waveforms generated by the first frequency multiplying factors and the amplitude multiplying coefficients illustrated in FIG. 11.

FIG. 12 is a diagram illustrating, in an overlapping manner, the basic waveform illustrated in FIG. 10 and three first waveforms generated by the first frequency multiplying factors and the amplitude multiplying coefficients illustrated in FIG. 11. The first waveforms are generated by the waveform generating part 240A (see FIG. 6). FIG. 12 illustrates, in the overlapping manner, the three first waveforms generated by the waveform generating part 240A.

The waveform illustrated by the solid line is the first waveform for which the first frequency multiplying factor is 1-fold. The waveform illustrated by the broken line is the first waveform for which the frequency multiplying factor is 2-fold. The waveform illustrated by the dot-and-dash line is the first waveform for which the frequency multiplying factor is 4-fold.

In this way, it is possible to generate, from the basic waveform illustrated in FIG. 10, the three first waveforms generated by the first frequency multiplying factors and the amplitude multiplying coefficients illustrated in FIG. 11.

Figure 13:
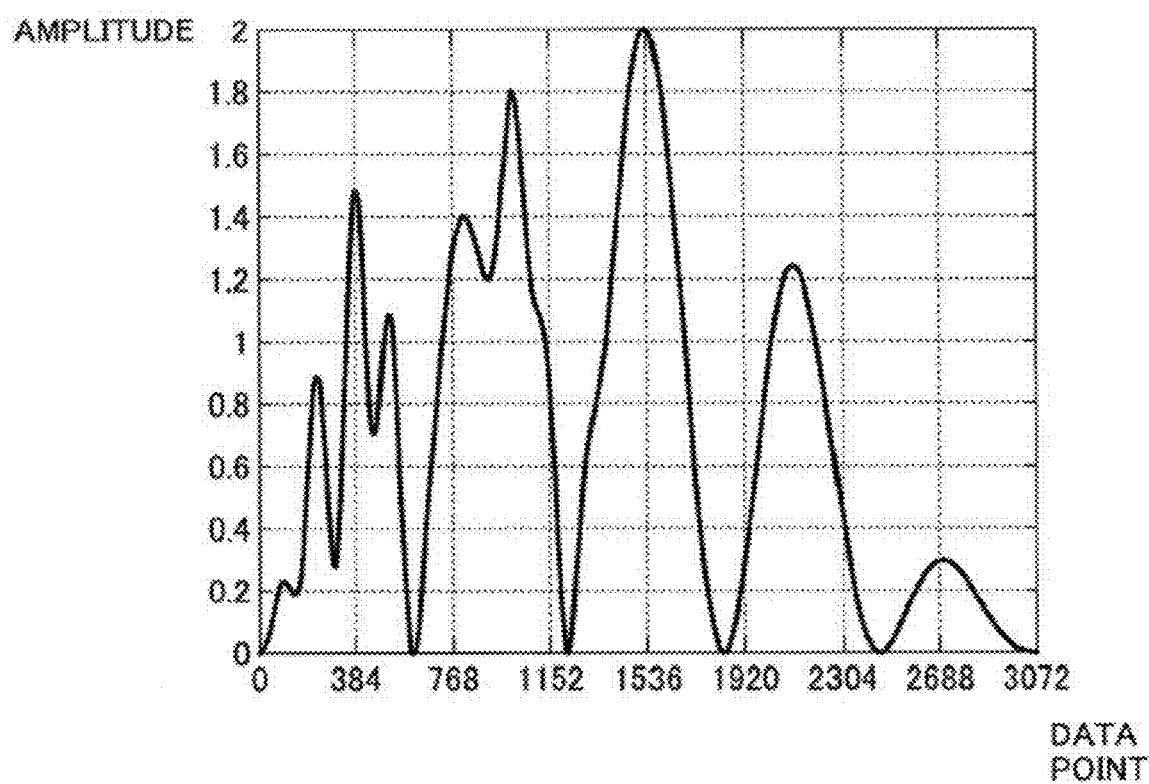
FIG. 13 is a diagram illustrating a first combined waveform obtained by combining the three first waveforms illustrated in FIG. 12.

FIG. 13 is a diagram illustrating the first combined waveform obtained by combining the three first waveforms illustrated in FIG. 12. The first combined waveform is combined by the waveform combining part 240B (see FIG. 6).

The first combined waveform with a changing random amplitude as illustrated in FIG. 13 can be generated by combining the three first waveforms (see FIG. 12), which are generated by using the first frequency multiplying factors and the amplitude multiplying coefficients illustrated in FIG. 11 to change the frequency and the amplitude values of the basic waveform illustrated in FIG. 10. This means that it is possible to generate various first combined waveforms from one basic waveform.

Further, although a second combined waveform is not illustrated here, as described above, the drive controlling part 240C reduces the first combined amplitude values included in the first combined waveform data in accordance with the value of a second frequency multiplying factor $a_f$ to decrease the number of data points, whereby second combined waveform data having a frequency obtained by multiplying the frequency of the first combined waveform data by the second frequency multiplying factor $a_f$ is generated.

For example, in a case where the second frequency multiplying factor $a_f$ obtained in accordance with the moving speed of the position of the manipulation input is "4", the frequency of the first combined waveform illustrated in FIG. 13 is multiplied by 4 to generate the second combined waveform.

Further, as described above, the drive controlling part 240C changes the amplitude values of the second combined waveform data in accordance with a contact load of the manipulation input to generate third combined waveform data.

Accordingly, for example, in a case where the second frequency multiplying factor $a_f$, which is obtained in accordance with the moving speed of the position of the manipulation input, is "4" and the contact load increases in accordance with the change of the position of the manipulation input, the amplitude values of the second combined waveform, which is obtained by quadrupling the frequency of the first combined waveform illustrated in FIG. 13, are amplified in accordance with the increase in the contact load to generate the third combined waveform data as amplitude data.

Next, processing that is executed by the drive controlling part 240C of the drive controlling apparatus 300 of the electronic device 100 according to the first embodiment will be described with reference to FIG. 14.

Figure 14:
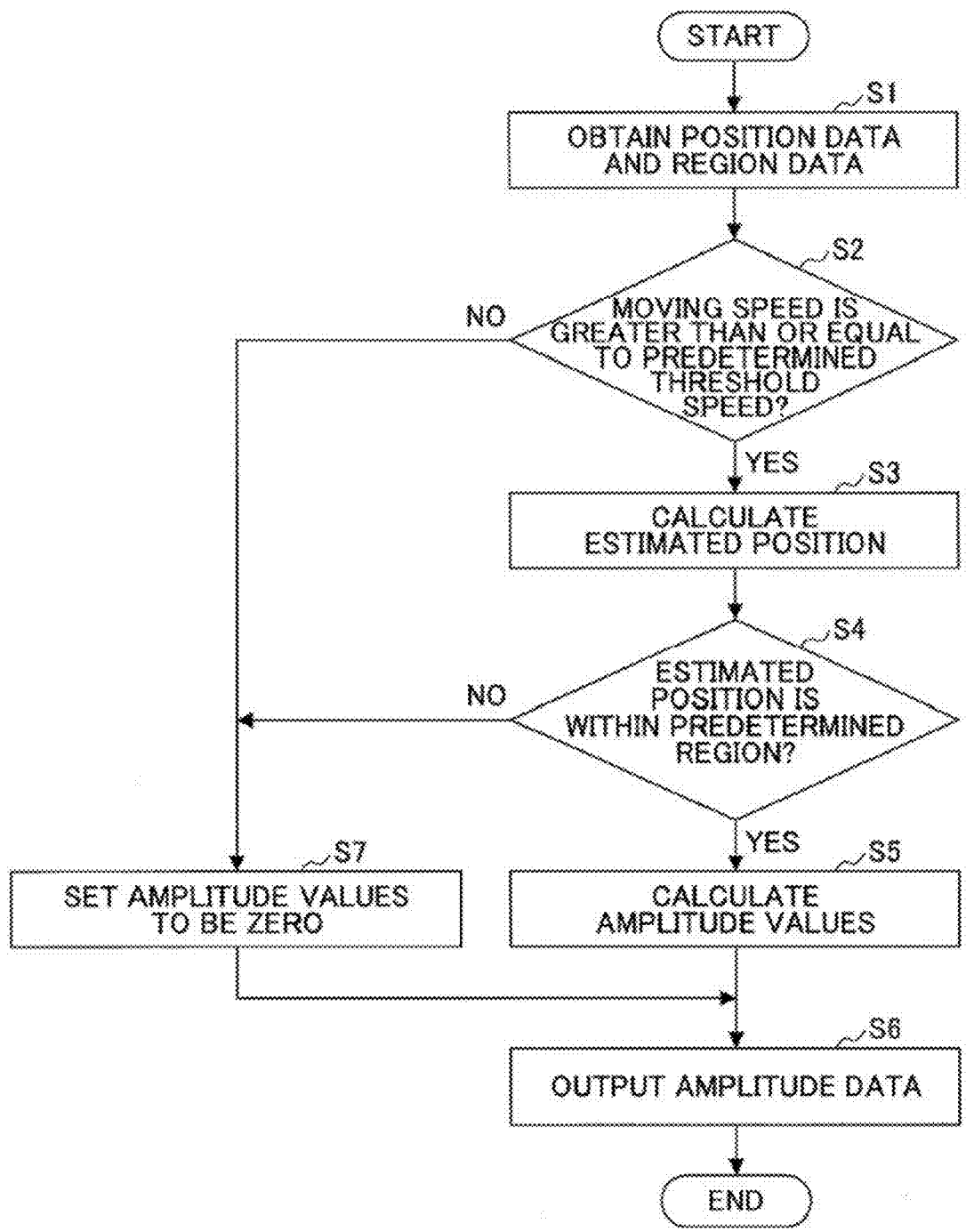
FIG. 14 is a flowchart illustrating processing that is executed by a drive controlling part of a drive controlling apparatus of the electronic device according to the first embodiment.

FIG. 14 is a flowchart illustrating the processing that is executed by the drive controlling part 240C of the drive controlling apparatus 300 of the electronic device 100 according to the first embodiment.

An operating system (OS) of the electronic device 100 executes control for driving the electronic device 100 every predetermined control cycle. Accordingly, the drive controlling apparatus 300 performs calculation for every predetermined control cycle. The same applies to the drive controlling part 240C. The drive controlling part 240C repeatedly executes the flow as illustrated in FIG. 14 for every predetermined control cycle.

Here, when a required period of time, from a point of time when position data is input from the driver IC 151 to the drive controlling apparatus 300 to a point of time when a driving signal is calculated by the amplitude modulator 320 based on the position data, is $\Delta t$, the required period $\Delta t$ of time is substantially equal to the control cycle.

A period of time of one cycle of the control cycle can be treated as a period of time corresponding to the required period $\Delta t$ of time, which is required from the point of time at which the position data is input to the drive controlling apparatus 300 from the driver IC 151 to the point of time at which the driving signal is calculated based on the input position data.

The drive controlling part 240C starts the processing when the electronic device 100 is powered on.

With respect to a GUI manipulation part on which a manipulation input is currently performed, the drive controlling part 240C obtains region data in step S1 in accordance with coordinates represented by the current position data and with a type of a current application. The region data is associated with a vibration pattern.

The drive controlling part 240C determines whether the moving speed is greater than or equal to the predetermined threshold speed (step S2). The moving speed may be calculated by a vector operation. The threshold speed may be set to be the minimum speed of the moving speed of the user's fingertip performing the manipulation input while moving the user's fingertip such as a flick operation, a swipe operation, a drag operation or the like. Such a minimum speed may be set based on an experimental result, a resolution of the touch panel 150 or the like.

In a case where the drive controlling part 240C has determined that the moving speed is greater than or equal to the predetermined threshold (YES in step S2), the drive controlling part 240C calculates in step S3 estimated coordinates of after the elapse of the required duration Δt of time based on the coordinates represented by the current position data and based on the moving speed.

The drive controlling part 240C determines in step S4 whether the estimated coordinates after the elapse of the required duration Δt of time is located within a region St which is represented by the region data obtained in step S1.

In a case where the drive controlling part 240C determines that the estimated coordinates after the elapse of the required duration Δt of time are within the region St represented by the region data obtained in step S1 (YES in step S4), the drive controlling part 240C calculates amplitude values in step S5. The process of the drive controlling part 240C calculating the amplitude values in step S5 is a process in which the drive controlling part 240C uses the first combined waveform data to obtain amplitude values of amplitude data to be output finally in accordance with the moving speed of the position of the manipulation input and with the contact load. Thus, the process of step S5 is performed by the waveform generating part 240A, waveform combining part 240B, and the drive controlling part 240C.

The drive controlling part 240C outputs the amplitude data in step S6. As a result, the amplitude modulator 320 generates a driving signal by modulating the amplitude of the sinusoidal wave output from the sinusoidal wave generator 310, and the vibrating element 140 is driven based on the driving signal.

On the other hand, in a case where the controlling part 240C has determined that the moving speed is not greater than or not equal to the predetermined threshold speed (NO in step S2) or in a case where the drive controlling part 240C has determined that the estimated coordinates after the elapse of the required duration Δt of time are not within the region St(NO in step S4), the drive controlling part 240C sets the amplitude value to be zero (step S7).

As a result, the drive controlling part 240C outputs amplitude data of which the amplitude value is set to be zero, and the amplitude modulator 320 generates a driving signal by modulating the amplitude of the sinusoidal wave output from the sinusoidal wave generator 310 to be zero. Accordingly, in this case, the vibrating element 140 is not driven.

Figure 15:
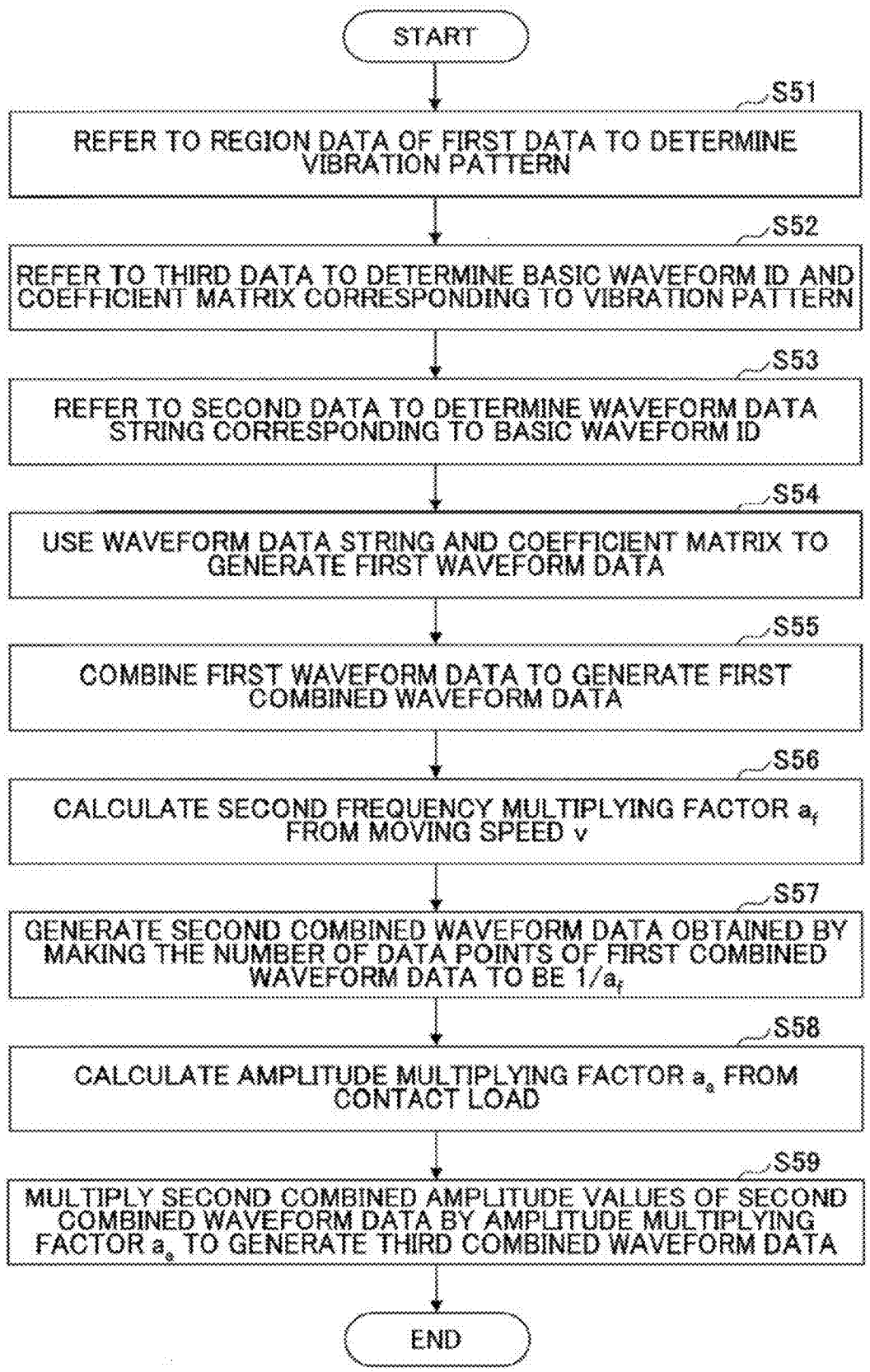
FIG. 15 is a flowchart illustrating processing details of the process of FIG. 14 in detail.

FIG. 15 is a flowchart illustrating processing details of the process of step S5 illustrated in FIG. 14 in detail. The processing illustrated in FIG. 15 is processing that is executed by the waveform generating part 240A, the waveform combining part 240B, and the drive controlling part 240C. Note that because the processing illustrated in FIG. 15 is executed when the electronic device 100 (see FIG. 6) executes the application, the application ID illustrated in FIG. 7 is already specified.

In step S51, the waveform generating part 240A refers to the region data of the first data (see FIG. 7) to determine a vibration pattern corresponding to the region data included in the position data.

Next, in step S52, the waveform generating part 240A refers to the third data (see FIG. 9) to determine a basic waveform ID and a coefficient matrix corresponding to the vibration pattern. In this way, the first frequency multiplying factors, the periodic numbers, and the amplitude multiplying coefficients are determined.

Next, in step S53, the waveform generating part 240A refers to the second data (see FIG. 8) to determine a waveform data string corresponding to the basic waveform ID obtained in step S52. In this way, the basic amplitude values are determined and the envelope structured by the basic amplitude values is determined. The envelope represents the basic waveform. For example, the basic waveform as illustrated in FIG. 10 is determined in step S53.

Next, the waveform generating part 240A uses the waveform data string and the coefficient matrix to generate first waveform data in step S54. For example, with respect to the basic waveform as illustrated in FIG. 10, the first frequency multiplying factors and the amplitude multiplying coefficients as illustrated in FIG. 11 are used to generate three sets of first waveform data that represents three first waveforms as illustrated in FIG. 12.

Next, the waveform combining part 240B combines the plurality of sets of first waveform data to generate first combined waveform data in step S55. For example, when the three waveforms as illustrated in FIG. 12 are combined, the first combined waveform data is obtained that represents the first combined waveform as illustrated in FIG. 13. Note that one of the plurality of sets of first waveform data may be the same as the basic waveform data.

Next, in step S56, the drive controlling part 240C calculates a second frequency multiplying factor $a_f$ from the moving speed v of the manipulation input. The second frequency multiplying factor $a_f$ is calculated by using the formulas (3), (4), and (5).

Next, in step S57, the drive controlling part 240C generates second combined waveform data whose number of data points is the number obtained by dividing the number of data points of the first combined amplitude values included in the first combined waveform data by $a_f$. That is, the drive controlling part 240C extracts a value for every $a_f$ values from the first combined amplitude values in the first time axis direction such that the second combined waveform data whose number of data points is $1/a_f$ of the number of data points of the first combined waveform data.

For example, in a case where the second frequency multiplying factor $a_f$ is "2" and the number of data points of the first combined waveform data is 1536, the drive controlling part 240C alternately extracts values from the first combined amplitude values (extracts one value for every two values of the first combined amplitude values) to generate the second combined waveform data of which the number of data points is 768. In this case, the frequency of the second combined waveform data is double the frequency of the first combined waveform data.

The drive controlling part 240C calculates the amplitude multiplying factor $a_a$ from the contact load in step S58. The contact load is obtained based on the touch area of the manipulation input as described above.

The drive controlling part 240C multiplies the second combined amplitude values, included in the second combined waveform data generated in step S57, by the amplitude multiplying factor $a_a$ to generate third combined waveform data in step S59. The amplitude values of the third combined waveform data are finally output from the drive controlling part 240C to the amplitude modulator 320 as the amplitude data.

As described above, the amplitude values of the amplitude data are set.

As described above, according to the electronic device 100 of the first embodiment, favorable tactile sensations can be provided to the user by generating the natural vibration of the top panel 120 in the ultrasound frequency band to change the kinetic friction force applied to the user's fingertip.

Further, the electronic device 100 of the first embodiment generates the driving signal by causing the amplitude modulator 320 to modulate only the amplitude of the sinusoidal wave, which is in the ultrasound frequency band generated, by the sinusoidal wave generator 310. The frequency of the sinusoidal wave in the ultrasound frequency band generated by the sinusoidal wave generator 310 is equal to the natural vibration frequency of the top panel 120. Further, this natural vibration frequency is set in consideration of the vibrating element 140.

That is, the driving signal is generated by the amplitude modulator 320 modulating only the amplitude values of the sinusoidal wave in the ultrasound frequency band generated by the sinusoidal wave generator 310, without modulating the frequency or the phase of the sinusoidal wave.

Accordingly, it becomes possible to generate, in the top panel 120, the natural vibration in the ultrasound frequency band of the top panel 120 and to decrease with certainty the kinetic friction coefficient applied to the user's finger tracing the surface 120A of the top panel 120 by utilizing the layer of air provided by the squeeze film effect. Further, it becomes possible to provide a favorable tactile sensation to the user as if a concavo-convex portion were present on the surface 120A of the top panel 120 by utilizing the Sticky-band Illusion effect or the Fishbone Tactile Illusion effect.

Because the electronic device 100 generates vibration in a case where the estimated coordinates, obtained by estimating the coordinates after the elapse of the required duration $\Delta t$ of time corresponding to the duration of time of one cycle of the control cycle, are within the predetermined region in which the vibration is to be generated, it becomes possible to generate the vibration while the user's fingertip is touching the predetermined GUI input part or the like.

Note that in a case where a delay corresponding to the required duration $\Delta t$ of time corresponding to the duration of time of one cycle of the control is not significant, the electronic device 100 is not required to perform the calculation of the estimated coordinates.

In the embodiment described above, in order to provide the tactile sensations to the user as if concave-convex portions were present on the top panel 120, the vibrating element 140 is switched on/off. Turning off the vibrating element 140 is equal to setting the amplitude value, represented by the driving signal used to drive the vibrating element 140, to be zero.

However, it is not necessary to turn the vibrating element 140 from on to off in order to provide such tactile sensations. For example, the vibrating element 140 may be driven to decrease the amplitude instead of turning off the vibrating element 140. For example, similar to turning the vibrating element 140 from on to off, the electronic device 100 may provide the tactile sensation to the user as if a concave-convex portion were present on the top panel 120 by decreasing the amplitude to approximately one-fifth.

In this case, the vibrating element 140 is driven by the driving signal such that the intensity of the vibration of the vibrating element 140 is changed. As a result, the intensity of the natural vibration generated in the top panel 120 is changed, and it becomes possible to provide the tactile sensation to the user's fingertip as if a concavo-convex portion were present.

When the vibrating element 140 is turned off to weaken the vibration in order to change the intensity of the vibration of the vibrating element 140, on/off of the vibrating element 140 is switched. Switching on/off the vibrating element 140 means driving the vibrating element 140 intermittently.

As described above, according to the first embodiment, it is possible to provide the drive controlling apparatus 300, the electronic device 100, and the drive controlling method that can provide favorable tactile sensations.

In the above, the basic waveform data is stored in the memory 250, first waveforms are obtained based on the basic waveform data and the first frequency multiplying factors and the amplitude multiplying coefficients included in the coefficient matrices, and the first combined waveform is obtained based on the plurality of first waveforms. Further, a second combined waveform can be obtained based on the first combined waveform. Furthermore, based on the second combined waveform, a third combined waveform used as amplitude data can be obtained.

Hence, data that represents waveform(s) to be stored in the memory 250 may be only the basic waveform data. The basic waveform data may be of a single type. Even in a case where only a single type of basic waveform data is stored in the memory 250, by setting first frequency multiplying factors and amplitude multiplying coefficients included in coefficient matrices to be various values, various types of first waveform data that represent various first waveforms can be generated and various types of amplitude data can be generated.

Therefore, according to the first embodiment, it is possible to significantly reduce the data amount stored in the memory 250. This means reducing the data amount significantly more than in a case where it is required, in order to output multiple types of amplitude data, to store waveform data corresponding to each amplitude data, for example.

Further, by using the second frequency multiplying factor $a_f$ to reduce the number of data points of the second combined waveform data from that of the first combined waveform data, the frequency of the second combined waveform data can be increased to be higher than that of the first combined waveform data in accordance with an increase in the speed of the manipulation input. Thereby, operability can be further improved.

Further, by using third combined waveform data obtained by using the amplitude multiplying factor $a_a$ to increase the amplitude values of the second combined waveform data, the amplitude values of the third combined waveform data can be increased to be higher than those of the second combined waveform data in accordance with an increase in the contact load. Thereby, operability can be further improved.

Note that in a case where the third combined waveform data, which can be obtained by increasing the amplitude values by use of the amplitude multiplying factor $a_a$ with respect to the second combined waveform data, the second combined waveform data is used as amplitude data to drive the vibrating element 140.

Furthermore, in a case where second combined waveform data, for which the second frequency multiplying factor $a_f$ is used to reduce the number of data points with respect to the first combined waveform data, is not generated, the first combined waveform data is used as amplitude data to drive the vibrating element 140.

Further, in a case where combined waveform data is generated by using the amplitude multiplying factor $a_a$ to increase the amplitude values of the first combined waveform data, the combined waveform data, generated by using the amplitude multiplying factor $a_a$ to increase the amplitude values, is used as amplitude data to drive the vibrating element 140.

Although the first waveform data that represents the first waveform obtained by changing the frequency and the amplitude values of the basic waveform is generated in the embodiment described above, first waveform data that represents a first waveform obtained by changing either the frequency or the amplitude values of the basic waveform may be generated.

In the above described embodiment, the drive controlling part 240C generates the second combined waveform data based on the first combined waveform data generated by the waveform combining part 240B, and uses the third combined waveform data, generated as the amplitude data, to adjust the intensity of the driving signal used to drive the vibrating element 140.

The second combined waveform data is generated by decimating and reducing the number of data points of the first combined waveform data in accordance with the degree of time change of the position of the manipulation input. Then, the third combined waveform data is generated by changing the second combined amplitude values of the second combined waveform data in accordance with the contact load of the manipulation input.

However, it is not necessary for the drive controlling part 240C to reduce the number of data points of the first combined waveform data in accordance with the degree of time change of the position of the manipulation input. Further, it is not necessary for the drive controlling part 240C to change the second combined amplitude values of the second combined waveform data in accordance with the contact load of the manipulation input.

Further, without reducing the number of data points of the first combined waveform data in accordance with the degree of time change of the position of the manipulation input, the drive controlling part 240C may change the first combined amplitude values of the first combined waveform data in accordance with the contact load of the manipulation input.

Furthermore, the drive controlling part 240C is not required to reduce the number of data points of the first combined waveform data in accordance with the degree of time change of the position of the manipulation input, and to change the second combined amplitude values of the second combined waveform data in accordance with the contact load of the manipulation input. In this case, the amplitude data output from the drive controlling part 240C is equal to the first combined waveform data generated by the waveform combining part 240B.

In the above described embodiment, the second data, from among the first data, the second data, and the third data, is stored in advance in the memory 250, and the first data and the third data are generated by the data generating part 240D in accordance with a content of the manipulation input by the user.

However, the second data may also be generated by the data generating part 240D in accordance with the content of the manipulation input by the user.

Further, one of the first data and the third data may be stored in advance in the memory 250 in addition to the second data, and the other of the first data and the third data may be generated by the user.

Further, in the above described embodiment, the drive controlling apparatus 300 includes the data generating part 240D. In accordance with a content of the manipulation input by the user, the data generating part 240D generates the first data and the third data or generates the first data, the second data, and the third data.

However, the drive controlling apparatus 300 is not required to include the data generating part 240D. In this case, the drive controlling apparatus 300 generates, based on the first data, the second data, and the third data stored in advance in the memory 250, an ultrasound vibration in accordance with the manipulation input of the user.

Further, in the above described embodiment, the waveform generating part 240A generates the first waveform data, the waveform combining part 240B combines the basic waveform data and the first waveform data to generate the first combined waveform data, and the drive controlling part 240C generates the second combined waveform data and the third combined waveform data based on the first combined waveform data. However, the processing of the waveform generating part 240A, the waveform combining part 240B, and the drive controlling part 240C may be changed as follows.

Figure 16:
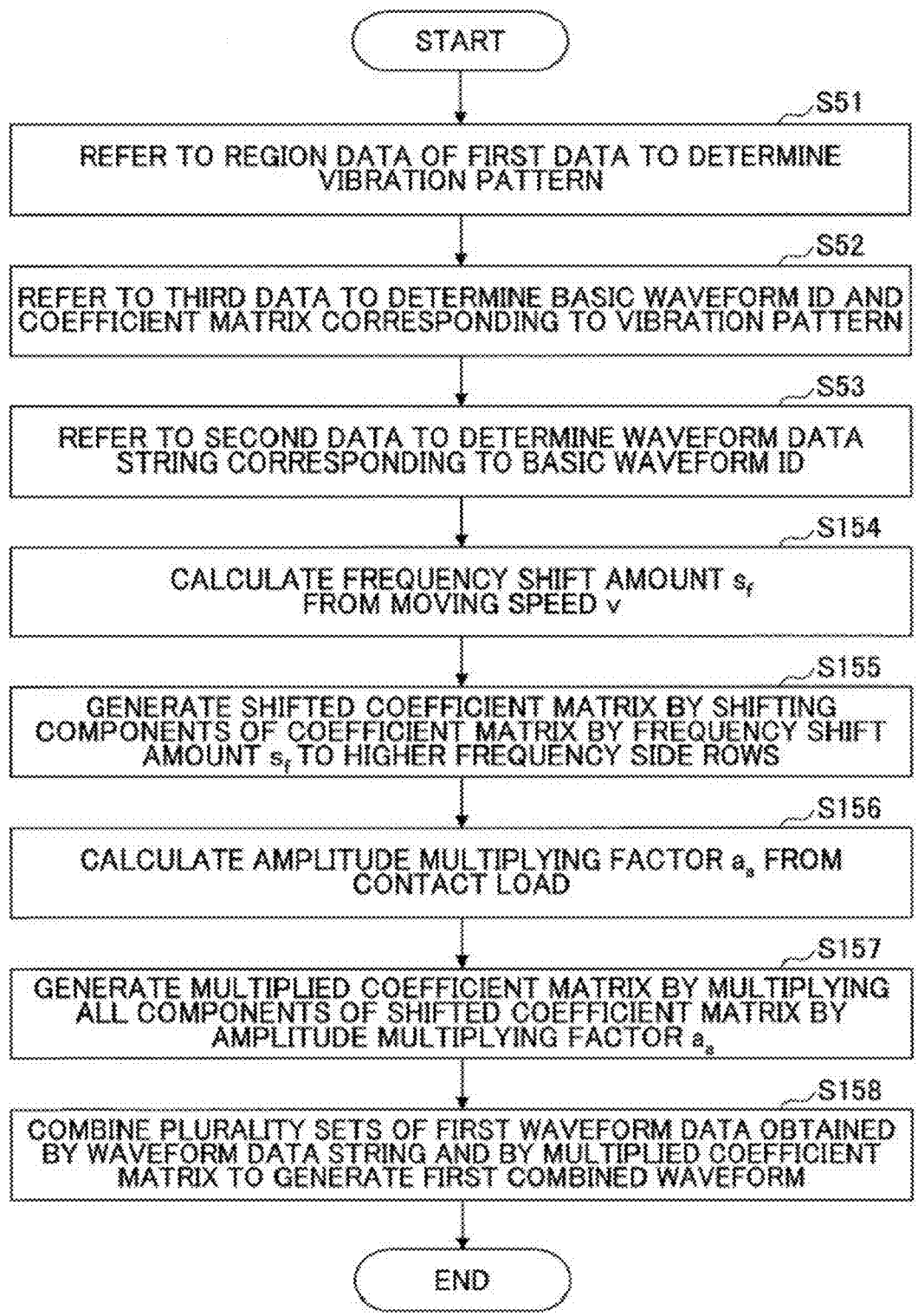
FIG. 16 is a flowchart illustrating processing by a variation example of the flowchart illustrated in FIG. 15.

FIG. 16 is a flowchart illustrating processing by a variation example of the flowchart illustrated in FIG. 15. The processing illustrated in FIG. 16 is processing that is executed by the waveform generating part 240A, the waveform combining part 240B, and the drive controlling part 240C. Note that because the processing illustrated in FIG. 16 is executed when the electronic device 100 (see FIG. 6) executes the application, the application ID illustrated in FIG. 7 is already specified.

Because the processes of steps S51 to S53 of FIG. 16 are the same as those of steps S51 to S53 illustrated in FIG. 15, their descriptions are omitted.

Upon determining the waveform data string in step S53, the waveform generating part 240A calculates a frequency shift amount $s_f$ from the moving speed v of the manipulation input in step S154. The frequency shift amount $s_f$ is obtained by the formula (4).

Next, the waveform generating part 240A generates a shifted coefficient matrix obtained by shifting the components of the coefficient matrix by the frequency shift amount $s_f$ to higher frequency side rows in step S155.

For example, in a case where the coefficient matrix is the 3-by-8 coefficient matrix corresponding to the vibration pattern P1 illustrated in FIG. 9 and the frequency shift amount $s_f$ is "2", the components of the 3-by-8 coefficient matrix are shifted toward the lower side (high frequency side) by two rows to generate a 5-by-8 shifted coefficient matrix in which components at the uppermost row where the frequency multiplying factor is 1-fold and components at the second uppermost row (components of the 2-by-8 matrix) are all "0". Note that this process will be described later below with reference to FIG. 17.

The drive controlling part 240C calculates the amplitude multiplying factor $a_a$ from the contact load in step S58. The contact load is obtained based on the touch area of the manipulation input as described above. The waveform generating part 240A obtains the contact load of the manipulation input based on a touch area represented by area data input from the drive controlling part 240C. Note that the data that represents the touch area and the position data may be directly input to the waveform generating part 240A from the driver IC 151.

Next, the waveform generating part 240A generates in step S157 a multiplied coefficient matrix obtained by multiplying all components of the shifted coefficient matrix generated in step S155 by the amplitude multiplying factor $a_a$ calculated in step S156.

Next, the waveform generating part 240A combines a plurality of sets of first waveform data obtained by the waveform data string determined in step S53 and by the multiplied coefficient matrix to generate first combined waveform data in step S158.

As described above, the amplitude values of the amplitude data are set.

The first combined waveform data generated in step S158 is output, as the amplitude data, by the drive controlling part 240C to the amplitude modulator 320 (see FIG. 6).

Figure 17:
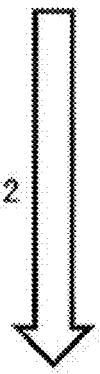
FIG. 17 is a diagram describing a process of generating a shifted coefficient matrix.

FIG. 17 is a diagram illustrating the process of generating the shifted coefficient matrix in step S155.

As illustrated in the upper side of FIG. 17, the coefficient matrix is a 3-by-8 matrix. Further, the frequency shift amount $S_f$ is "2". The frequency shift amount $s_f$ being 2 corresponds to the second frequency multiplying factor $a_f$ being 4-fold.

In the 3-by-8 coefficient matrix illustrated in the upper side of FIG. 17, at the uppermost row (where the first frequency multiplying factor is 1-fold), the amplitude multiplying coefficients are set to be a11, a12, 0, 0, 0, 0, 0, and 0. Further, at the second uppermost row (where the first frequency multiplying factor is 2-fold), the amplitude multiplying coefficients are set to be a21, a22, a23, a24, 0, 0, 0, and 0. Further, at the third uppermost row (where the first frequency multiplying factor is 4-fold), the amplitude multiplying coefficients are set to be a31, a32, a33, a34, a35, a36, a37, and a38.

In such a case, the waveform generating part 240A shifts the components of the 3-by-8 coefficient matrix by the frequency sift amount $s_f$ toward the lower side (high frequency side), and sets "0" to all components to be blank by shifting the rows.

Here, because the frequency shift amount $s_f$ is "2", the waveform generating part 240A shifts the components of the 3-by-8 coefficient matrix, illustrated in the upper side of FIG. 17, by two rows toward the lower side (high frequency side), and sets 0 to all the components (the 2-by-8 matrix components) of the uppermost row where the frequency multiplying factor is 1-fold and of the second uppermost row.

According to such a process, the waveform generating part 240A generates a 5-by-8 shifted coefficient matrix illustrated in the lower side of FIG. 17.

Then, the waveform generating part 240A generates a multiplied coefficient matrix by multiplying all the components of the shifted coefficient matrix by the amplitude multiplying factor $a_a$, and the waveform combining part 240B combines the waveform string and a plurality of sets of first waveform data obtained by the multiplied coefficient matrix to generate first combined waveform data.

The first combined waveform data generated by the processing illustrated in FIG. 16 is output, as the amplitude data, by the drive controlling part 240C to the amplitude modulator 320 (see FIG. 6).

As described above, the processing of FIG. 16 does not include a process for generating second combined waveform data by making the number of data points of first combined amplitude values $1/a_f$ included in first combined waveform data, as in the processing illustrated in FIG. 15.

Hence, by generating the amplitude data through the processing of the flowchart illustrated in FIG. 16, an amount of calculation can be reduced relative to that of the processing illustrated in FIG. 15.

Here, variation examples of the electronic device 100 according to the first embodiment will be described with reference to FIG. 18 to FIG. 22.

Figure 18:
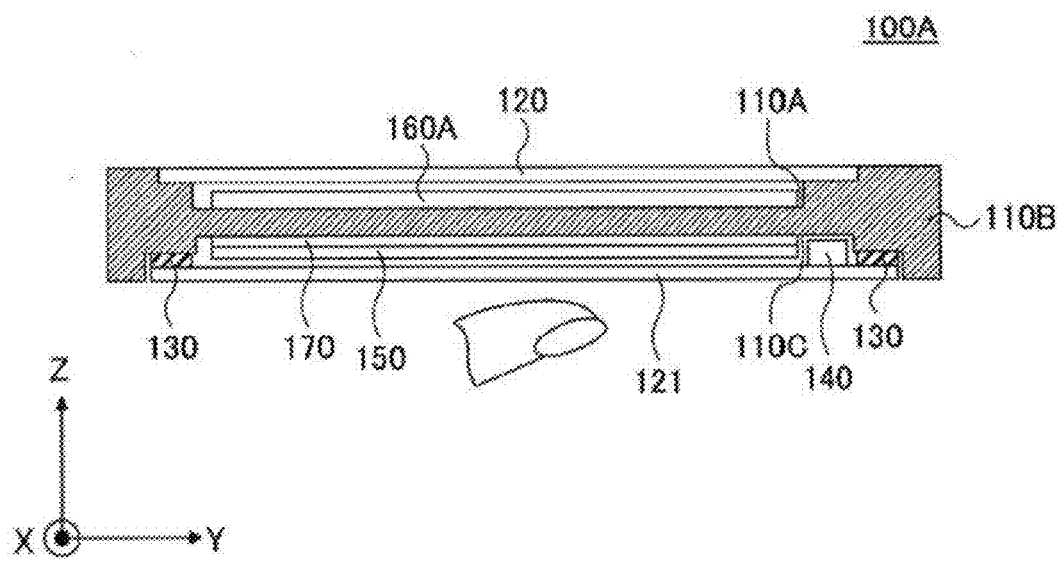
FIG. 18 is a diagram illustrating a cross section of an electronic device according to a variation example of the first embodiment.

FIG. 18 is a diagram illustrating a cross section of an electronic device 100A according to a variation example of the first embodiment. The cross section illustrated in FIG. 18 corresponds to the cross section taken along the line A-A as illustrated in FIG. 3. In FIG. 18, an XYZ coordinate system, which is an orthogonal coordinate system, similar to that illustrated in FIG. 3 is defined.

The electronic device 100A includes a housing 110B, the top panel 120, a panel 121, the double-faced adhesive tape 130, the vibrating element 140, the touch panel 150, a display panel 160A, and the substrate 170.

The electronic device 100A has a configuration in which the touch panel 150 of the electronic device 100 illustrated in FIG. 3 is provided on the back face side (the negative side in the Z axis direction). Thus, in comparison with the electronic device 100 illustrated in FIG. 3, the double-faced adhesive tape 130, the vibrating element 140, the touch panel 150, and the substrate 170 are disposed on the back face side.

A recessed portion 110A at the positive side in the Z axis direction and a recessed portion 110C at the negative side in the Z axis direction are formed on the housing 110B. The display panel 160A is disposed inside the recessed portion 110A and is covered with the top panel 120. The substrate 170 and the touch panel 150 are stacked and disposed inside the recessed portion 110C. The panel 121 is secured to the housing 110B with the double-faced adhesive tape 130. The vibrating element 140 is disposed on a positive side surface of the panel 121 in the Z axis direction.

When on/off of the vibrating element 140 is switched to generate the natural vibration in the ultrasound frequency band in the panel 121 in accordance with a manipulation input performed on the panel 121 in the electronic device 100A illustrated in FIG. 18, in a way similar to the electronic device 100 illustrated in FIG. 3, the electronic device 100A with which a user can sense tactile sensations corresponding to an image displayed on the display panel 160A through the user's fingertip can be provided.

Although FIG. 18 illustrates the electronic device 100A in which the touch panel 150 is provided at the back surface side, the touch panel 150 may be provided for each of the front surface side and the back surface side by combining the structure illustrated in FIG. 3 and the structure illustrated in FIG. 18.

Figure 19:
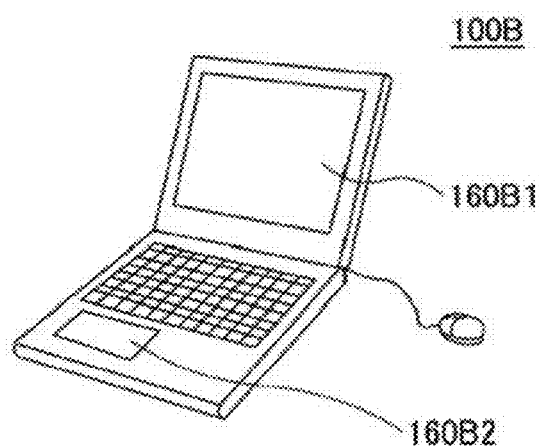
FIG. 19 is a diagram illustrating an electronic device according to a variation example of the first embodiment.

FIG. 19 is a diagram illustrating an electronic device 100B according to a variation example of the first embodiment. The electronic device 100B is a notebook Personal Computer (PC).

The electronic device 100B includes a display panel 160B1 and a touch pad 160B2.

Figure 20:
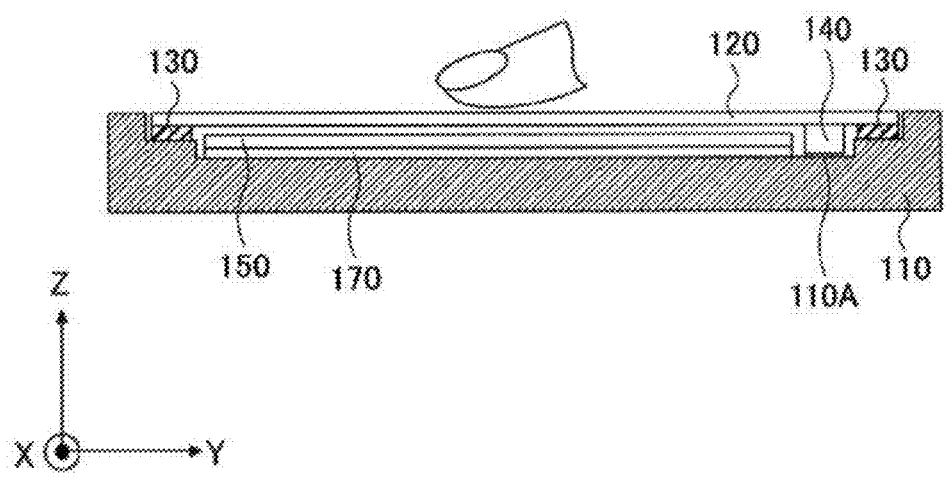
FIG. 20 is a diagram illustrating a cross section of a touch pad of the electronic device according to the variation example of the first embodiment.

FIG. 20 is a diagram illustrating a cross section of the touch pad 160B2 of the electronic device 100B according to the variation example of the first embodiment. The cross section illustrated in FIG. 20 corresponds to the cross section taken along the line A-A as illustrated in FIG. 3. In FIG. 20, an XYZ coordinate system, which is an orthogonal coordinate system, similar to that illustrated in FIG. 3 is defined.

The touch pad 160B2 has a configuration in which the display panel 160 is omitted from the electronic device 100 illustrated in FIG. 3.

By switching on/off the vibrating element 140 to generate the natural vibration in the ultrasound frequency band in the top panel 120 in accordance with a manipulation input performed on the touch pad 160B2 in the electronic device 100B as a PC as illustrated in FIG. 19, in a way similar to the electronic device 100 illustrated in FIG. 3, an operational feeling can be provided to the user's fingertip through tactile sensations in accordance with an amount of movement of the manipulation input performed on the touch pad 160B2.

Further, by providing the vibrating element 140 at the back surface of the display panel 160B1, in a way similar to the electronic device 100 illustrated in FIG. 3, an operational feeling can be provided to the user's fingertip through tactile sensations in accordance with an amount of movement of the manipulation input performed on the display panel 160B1. In this case, the electronic device 100 illustrated in FIG. 3 may be provided instead of the display panel 160B1.

Figure 21:
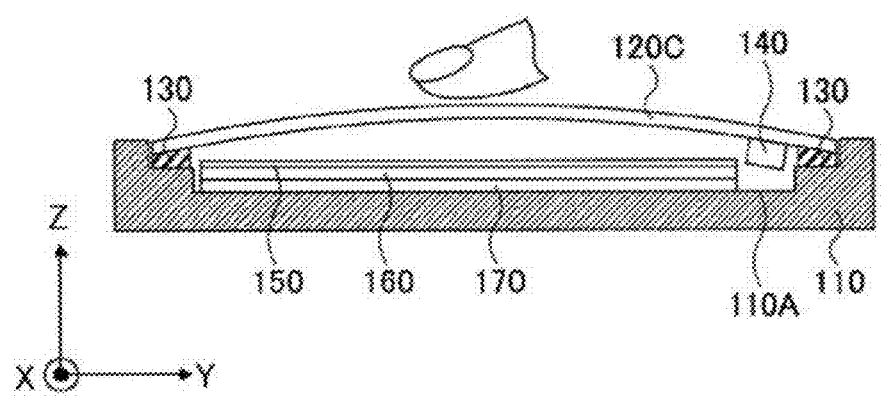
FIG. 21 is a plan view illustrating an operating state of an electronic device according to a variation example of the first embodiment.

FIG. 21 is a plan view illustrating an operating state of an electronic device 100C according to a variation example of the first embodiment.

The electronic device 100C includes the housing 110, a top panel 120C, the double-faced adhesive tape 130, the vibrating element 140, the touch panel 150, the display panel 160 and the substrate 170.

Except for the top panel 120C which is a curved glass, the electronic device 100C illustrated in FIG. 21 has a configuration similar to the configuration of the electronic device 100 of the first embodiment illustrated in FIG. 3.

The top panel 120C is curved so that its center portion protrudes towards a positive side in the Z axis direction. Although FIG. 21 illustrates a cross sectional shape of the top panel 120C in the YZ plane, a cross sectional shape in a XZ plane is similar to the cross sectional shape in the YZ plane.

In this way, it is possible to provide favorable tactile sensations by using the top panel 120C of the curved glass. In particular, it is effective for a case where a shape of an actual object to be displayed as an image is curved.

Second Embodiment

A drive controlling apparatus and an electronic device according to a second embodiment have configurations respectively similar to those of the drive controlling apparatus 300 and the electronic device 100 of the first embodiment. In the drive controlling apparatus and the electronic device according to the second embodiment, structures of the second data and the third data stored in the memory 250 are different from the structures of those of the first embodiment.

Figures 22, 23:
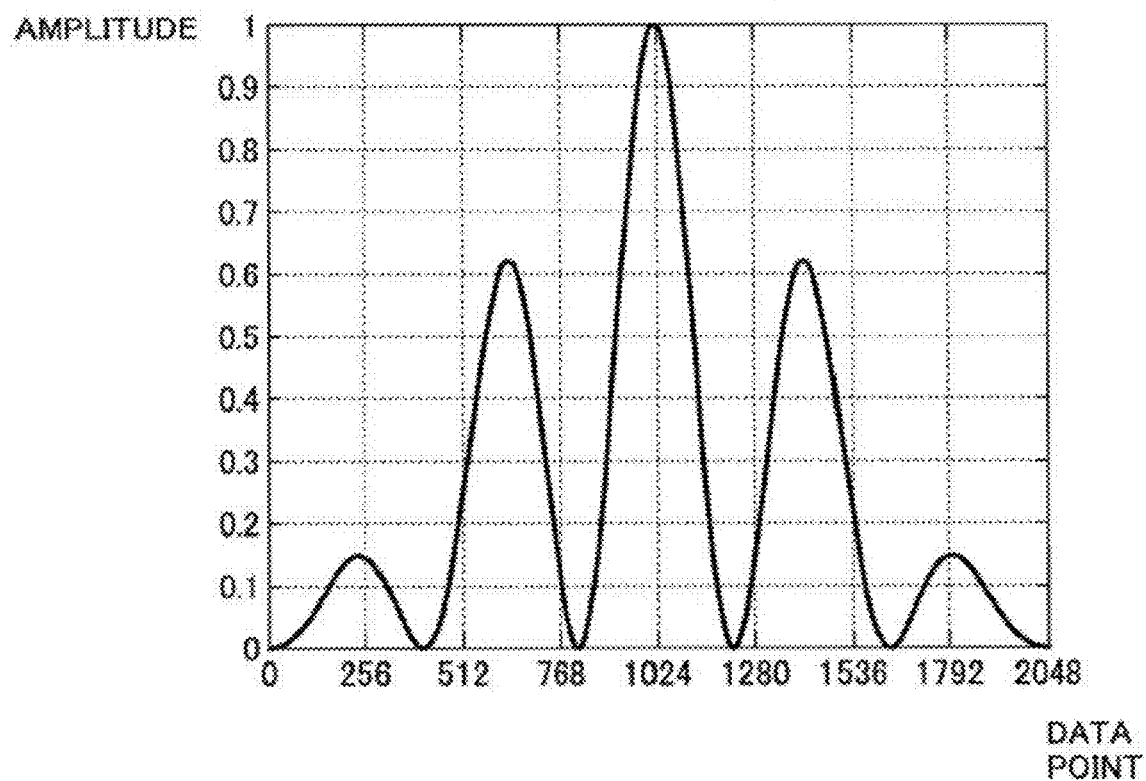
FIG. 22 is a diagram illustrating a second basic waveform additionally used in a second embodiment.
FIG. 23 is a diagram illustrating second data stored in the memory according to the second embodiment.

FIG. 22 is a diagram illustrating a second basic waveform additionally used in the second embodiment. The second basic waveform, illustrated as an example in FIG. 22, is given as an envelope structured with 2048 basic amplitude values. The amplitude values have five peaks, and the 1024-th amplitude value is the maximum. The basic amplitude values representing such amplitudes may be set by the waveform data string illustrated in FIG. 23.

In the second embodiment, the basic waveform illustrated in FIG. 10 is used as a first basic waveform and the second basic waveform illustrated in FIG. 22 is used to generate amplitude data. The second basic waveform is an example of a sub-basic waveform.

The second basic waveform illustrated in FIG. 22 has a second basic frequency that is 1.5-fold of the basic frequency of the basic waveform illustrated in FIG. 10. The second frequency is not limited to 1.5-fold of the basic frequency, but may be any value that is not an integral multiple of the basic frequency and is a decimal (number having an integer part and a decimal part) multiple of the basic frequency.

FIG. 23 is a diagram illustrating the second data stored in the memory 250 of the second embodiment.

The second data of the second embodiment has a data format in which $[\alpha1, \alpha2, \alpha3, \ldots, \alpha2048]$ is added to the waveform data string of which the basic waveform ID illustrated in FIG. 8 is fw_id1. The waveform data string $[\alpha1, \alpha2, \alpha3, \ldots, \alpha2048]$ includes 2048 basic amplitude values $\alpha1$ to $\alpha2048$.

The waveform data string $[\alpha1, \alpha2, \alpha3, \ldots, \alpha2048]$ represents an envelope structured by the basic amplitude values $\alpha1$ to $\alpha2048$. This envelope represents the second basic waveform of which the basic waveform ID is fw_id1 illustrated in FIG. 22.

FIG. 23 is a diagram illustrating the third data stored in the memory 250 of the second embodiment.

The third data of the second embodiment has a structure in which a coefficient matrix corresponding to the second basic waveform is added to the third data illustrated in FIG. 9.

For example, FIG. 24 illustrates coefficient matrices associated with the vibration pattern P1 and the basic waveform ID fw_id21. The coefficient matrices include the coefficient matrix associated with the vibration pattern P1 and the basic waveform ID fw_id1 illustrated in FIG. 9 as a first coefficient matrix, and an added second coefficient matrix as follows.

The second coefficient matrix includes $\alpha11, \alpha12, \alpha13, 0, 0, 0, 0, 0, 0, 0,$ and $0$ as amplitude multiplying coefficients whose first frequency multiplying factor is 1-fold. Further, the second coefficient matrix includes $\alpha21, \alpha22, \alpha23, \alpha24, \alpha25, \alpha26, 0, 0, 0, 0, 0,$ and $0$ as amplitude multiplying coefficients whose first frequency multiplying factor is 2-fold. Furthermore, the coefficient matrix includes $\alpha31, \alpha32, \alpha33, \alpha34, \alpha35, \alpha36, \alpha37, \alpha38, \alpha39, \alpha310, \alpha311,$ and $\alpha312$ as amplitude multiplying coefficients whose first frequency multiplying factor is 4-fold.

The first coefficient matrix of the coefficient matrices illustrated in FIG. 24 is used to generate the first waveform from the first basic waveform illustrated in FIG. 23, and the second coefficient matrix is used to generate the first waveform from the second basic waveform illustrated in FIG. 23. The first waveform generated from the second basic waveform is an example of a first sub-waveform.

The first waveform generated from the first basic waveform and the first waveform generated from the second basic waveform are combined by the waveform combining part 240B to generate a first combined waveform. Subsequently, a second combined waveform is generated based on the first combined waveform in a manner similar to the first embodiment.

According to the second embodiment, as described above, the amplitude data is generated by using the basic waveform illustrated in FIG. 10 as the first basic waveform and by using the second basic waveform illustrated in FIG. 22.

The second waveform illustrated in FIG. 22 has a second frequency that is 1.5-fold of the basic frequency of the basic frequency of the basic waveform illustrated in FIG. 10. According to the second embodiment, in comparison with the first wave, various types of amplitude data can be generated by additionally using a second basic waveform having a frequency that is a decimal multiple of that of the first basic frequency.

Next, a method will be described with reference to FIG. 25 to FIG. 29 by which a user sets amplitude data. The user activates an ultrasound vibration setting application installed in the electronic device 100 (see FIG. 1 and FIG. 6) to perform the following processing such that desired ultrasound vibration can be set to a desired image or the like. Note that the ultrasound vibration setting application is executed by the data generating part 240D (see FIG. 6).

FIG. 25 is a diagram illustrating a state of a dialog box 161 displayed on the display panel 160. The dialog box 161 is used when setting first frequency multiplying factors and amplitude multiplying coefficients. When the ultrasound vibration setting application is activated and a mode for setting the first frequency multiplying factors and the amplitude multiplying coefficients is selected, the dialog box 161 is displayed on the display panel 160.

The dialog box 161 can set first frequency multiplying factors and amplitude multiplying coefficients used to set a first waveform. Note that in the embodiment described here, two basic waveforms having basic frequencies A and B are used to set the first frequency multiplying factors and the amplitude multiplying coefficients.

Displaying the dialog box 161 is similar to displaying the first frequency multiplying factors and the amplitude multiplying coefficients included in the coefficient matrix illustrated in the table of FIG. 11. In the dialog box 161, text boxes 161A, 161A2, 161A4, 161A8, 161B, 161B2, 161B4, and 161B8, a finish button 161C, a data initializing button 161D, and a drop down list 161E that is for selecting a vibration pattern are displayed.

The text boxes 161A, 161A2, 161A4, 161A8, 161B, 161B2, 161B4, and 161B8 are input fields or input parts for inputting amplitude multiplying coefficients. Although FIG. 25 illustrates the state in which the amplitude multiplying coefficients of all the text boxes are "0", the user can input selectable values in the respective text boxes.

The text boxes 161A are input parts for inputting the amplitude multiplying coefficients with respect to a first waveform of which the first frequency multiplying factor is 1-fold relative to the first basic waveform having the basic frequency A. Here, for example, the first basic waveform having the basic frequency A is a basic waveform having 3072 data points of basic amplitude values. In FIG. 25, the two text boxes 161A can be used to input the amplitude multiplying coefficients for two periods with respect to the first waveform of which the first frequency multiplying factor is 1-fold.

The text boxes 161A2, 161A4, 161A8 are input parts for inputting the amplitude multiplying coefficients of first waveforms of which the first frequency multiplying factors are 2-fold, 4-fold, and 8-fold relative to the basic frequency A, respectively. Hence, FIG. 25 illustrates the four text boxes 161A2, the eight text boxes 161A4, and the sixteen text boxes 161A8.

The text boxes 161B are input parts for inputting the amplitude multiplying coefficients with respect to a first waveform of which the first frequency multiplying factor is 1-fold relative to the second basic waveform having the basic frequency B. Here, for example, the basic frequency B is 1.5-fold of the basic frequency A. The second basic waveform having the basic frequency B is a basic waveform having 2048 data points of basic amplitude values. In FIG. 25, the three text boxes 161B can be used to input the amplitude multiplying coefficients for three periods with respect to the first waveform of which the first frequency multiplying factor is 1-fold.

The text boxes 161B2, 161B4, 161B8 are input parts for inputting the amplitude multiplying coefficients of first waveforms of which the first frequency multiplying factors are 2-fold, 4-fold, and 8-fold relative to the basic frequency B, respectively. Hence, FIG. 25 illustrates the six text boxes 161B2, the twelve text boxes 161B4, and the twenty-four text boxes 161B8.

The user can set the amplitude multiplying coefficients and the first frequency multiplying factors to be the desired values by using the dialog box 161 illustrated in FIG. 25.

It is assumed that the user enters the amplitude multiplying coefficients in the dialog box 161, and a vibration pattern P1 and a vibration pattern P2 are generated based on the first basic waveform having the basic frequency A and the second basic waveform having the basic frequency B. The vibration patterns P1 and P2 are different from each other. Vibrations generated in the top panel 120 by the vibration patterns P1 and P2 will be described later below with reference to FIG. 28.

Although the two vibration patterns P1 and P2 are generated based on a common basic waveform in the embodiment described here, the two vibration patterns P1 and P2 may be generated based on basic waveforms different from each other.

By the user performing processing as described above, third data that includes vibration patterns, basic waveform IDs and a coefficient matrix is generated by the data generating part 240D. The data generating part 240D stores the third data in the memory 250.

In a case where the user inputs the amplitude multiplying coefficients as described above, the vibration patterns are the vibration patterns P1 and P2, and the basic waveform IDs are the basic waveform IDs of the basic waveforms having the basic frequencies A and B. Note that the basic waveform IDs of the basic waveforms having the basic frequencies A and B are stored as second data in association with the basic waveform data (waveform data strings) in the memory 250 in advance.

Further, the coefficient matrix is a coefficient matrix that includes the amplitude multiplying coefficients set in the text boxes 161A, 161A2, 161A4, 161A8, 161B, 161B2, 161B4, and 161B8.

Figure 26:
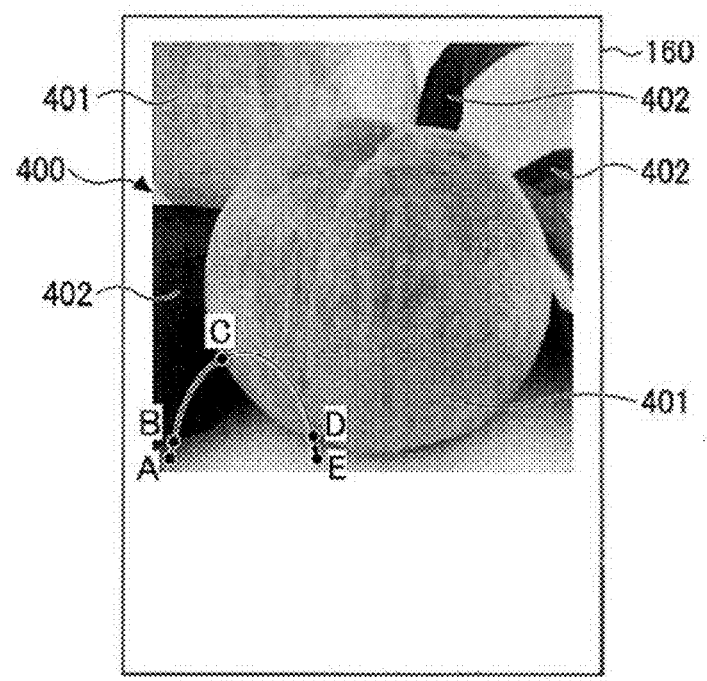
FIG. 26 is a diagram illustrating an image selected by a user as an object to which amplitude data is set.
Figure 27:
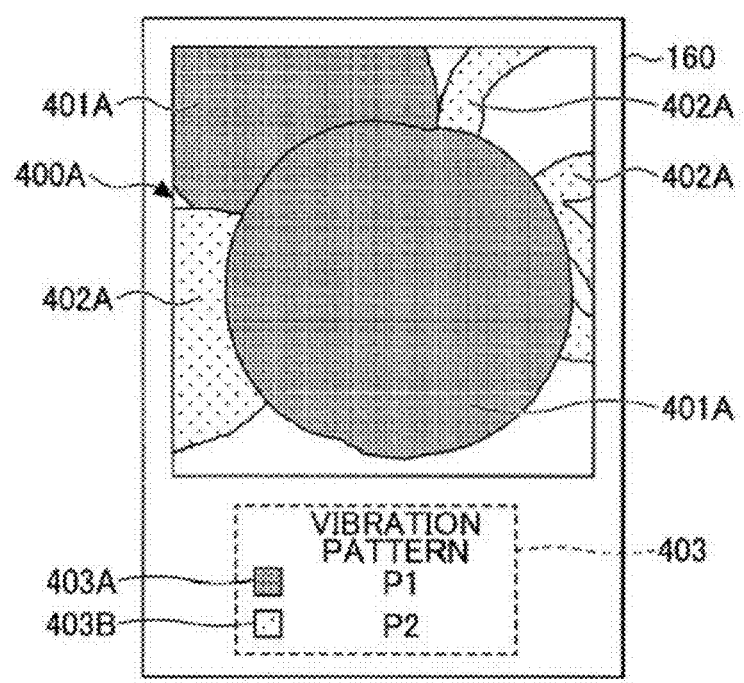
FIG. 27 is a diagram illustrating a state of the display panel when the amplitude data is set to the image illustrated in FIG. 26.

FIG. 26 is a diagram illustrating an image selected by a user as an object to which amplitude data is set. FIG. 27 is a diagram illustrating a state of the display panel 160 when the amplitude data is set to the image illustrated in FIG. 26.

After creating the vibration patterns P1 and P2 by using the ultrasound vibration settling application activated by the electronic device 100 (see FIG. 1 and FIG. 6) to set the amplitude multiplying coefficients or the first frequency multiplying factors as illustrated in FIG. 25, the user can cause the display panel 160 to display the image 400 as illustrated in FIG. 26. The image 400 includes images of fruits 401 and leaves 402, for peaches.

Here, processing of setting ultrasound vibrations to the image 400 will be described with reference to FIG. 26.

The ultrasound vibration setting application activates a design tool for graphics so that the user becomes able to set the ultrasound vibrations to the image 400. For example, the design tool for graphics may be a tool that can recognize outlines of the fruit 401 and the leaves 402 included in the image 400 to display them on the canvas 400A. By using the tool, a user can freely paint and can freely set vibration patterns to the painted regions.

For example, in FIG. 27, a pallet 403 is displayed below a canvas 400A. A dark grey paint and a light grey paint can be used to freely color-code the inside of the canvas 400A. When a button 403A displayed in the dark grey is pushed to designate a region to be painted, the designated region is painted in the dark grey. When a button 403B displayed in the light grey is pushed to designate a region to be painted, the designated region is painted in the light grey.

The vibration pattern P1 is set to the region painted in the dark grey. The vibration pattern P2 is set to the region painted in the light grey.

Although the dark grey paint and the light grey paint are illustrated here, the dark grey paint is a red paint and the light grey paint is a green paint in practice, for example. Further, although two colors of paints are illustrate as an example, three or more colors of paints may be prepared.

As illustrated in FIG. 27, the user paints the fruits 401A in the dark grey and paints the leaves 402A in the light grey along the outlines of the fruits 401A and the leaves 402A displayed on the canvas 400A.

The user performs such processing such that the ultrasound vibration setting application associates the region data of the regions painted in the dark grey with the vibration pattern P1 and associates the region data of the regions painted in the light grey with the vibration pattern P2 to create the first data. The first data created by the data generating part 240D in such a way is similar to the first data illustrated in FIG. 7. The data generating part 240D stores the first data in the memory 250.

Note that the canvas 400A illustrated in FIG. 27 and the image 400 illustrated in FIG. 26 may be simultaneously displayed in divided layers. In such a way, the user can paint the canvas 400A while viewing the image 400.

Further, when data of the image 400 is read first, the image 400 may be automatically divided into regions by image processing to generate a default state in which the respective regions are tentatively color-coded such that painting is started from the default state.

Figure 28:
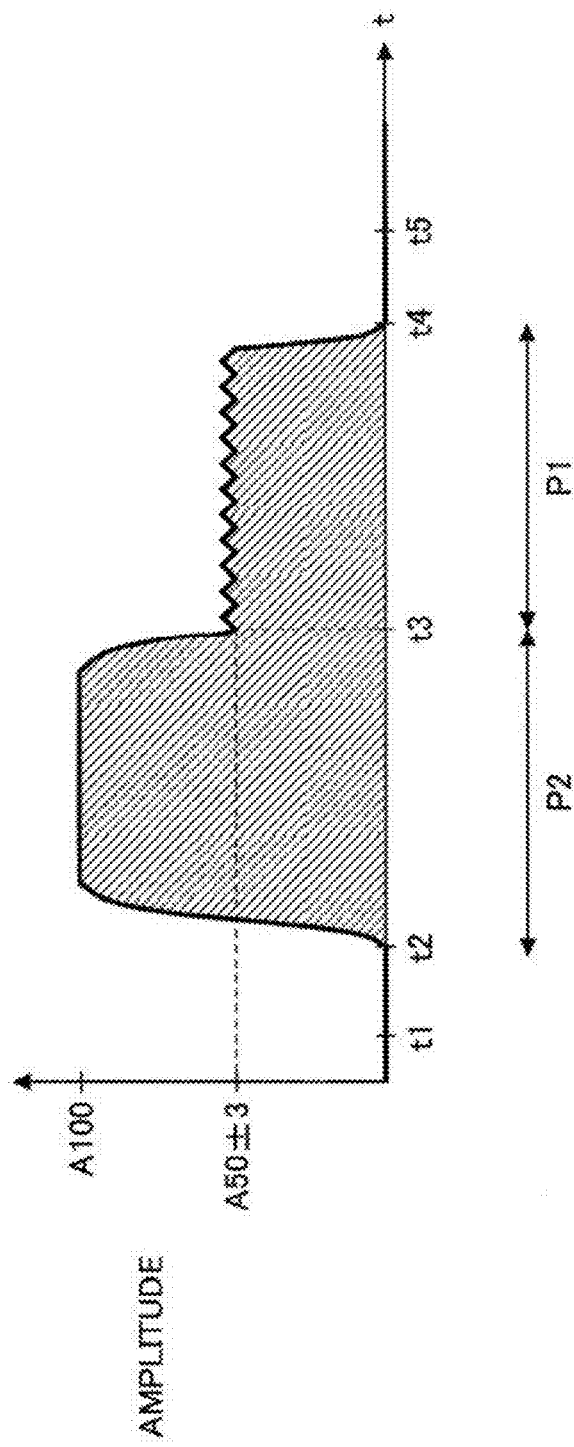
FIG. 28 is a diagram illustrating vibration patterns generated in the top panel.

FIG. 28 is a diagram illustrating the vibration patterns P1 and P2 generated in the top panel 120. In FIG. 28, a horizontal axis represents a time axis, and a vertical axis represents the amplitude value of the amplitude data output from the drive controlling part 240C.

In the following description, the vibration patterns P1 and P2 illustrated in FIG. 28 are obtained in a case where the user sets desired first frequency multiplying factors and desired amplitude multiplying coefficients in the dialog box 161 illustrated in FIG. 25 in order to realize simulated tactile sensations of the fruits 401 and the leaves 402 of the peaches illustrated in FIG. 26.

As a precondition, third data (see FIG. 9) that includes the vibration patterns P1 and P2 for realizing the simulated tactile sensations of the fruits 401 and the leaves 402 of the peaches illustrated in FIG. 26, and first data (see FIG. 7) that associates, with the vibration patterns P1 and P2, region data that represents the regions of the fruits 401 and the leaves 402 of the peaches as illustrated in FIG. 27 are generated.

Here, the user performs a manipulation input of tracing the surface 120A of the top panel 120 from the point A to point E via the points B, C, and D illustrated in FIG. 26 with respect to the peach image 400. The point A is not on the fruits 401 and not on the leaves 402. The point B is on the end of the leaf 402. The point C is on the boundary between the leaf 402 and the fruit 401. The point D is on the end of the fruit 401. The point E is not on the fruits 401 and not on the leaves 402.

When such a manipulation input is performed, the drive controlling apparatus 300 drives the vibrating element 140 as illustrated in FIG. 28.

When the user's fingertip touches the point A at time t1, the drive controlling apparatus 300 does not drive the vibrating element 140 because the point A is a point apart from the fruits 401 and the leaves 402 of the peaches and the vibration patterns P1 and P2 are not set to the point A. Thus, the amplitude is zero.

When the user's fingertip has reached the point B at time t2, a vibration according to the vibration pattern P2 corresponding to the leaf 402 is generated in the top panel 120. In this way, the user can feel a start of touching the leaf 402 of the peach through the user's fingertip.

Subsequently, until reaching the point C, the vibration according to the vibration pattern P2 is generated in the top panel 120. Therefore, the user can feel, through his or her fingertip, smoothness of the surface of the leaf 402 of the peach with the tactile sensation. An amplitude value A100 according to the vibration pattern P2 is set to be a relatively large value in order to express the smooth tactile sensation of the leaf 402 of the peach. This is because as the amplitude value increases, the kinetic friction force applied to the user's fingertip is decreased by the squeeze film effect and it becomes smooth.

When the user's fingertip has reached the point C at time t3, a vibration according to the vibration pattern P1 corresponding to the fruit 401 is generated in the top panel 120. That is, the vibration pattern P2 is switched to the vibration pattern P1 at time t3. In this way, the user can feel a start of touching the fruit 401 of the peach through the user's fingertip.

The vibration pattern P1 is set to have smaller amplitude values than the amplitude value A100 according to the vibration pattern P2 in order to express a tactile sensation combining a slightly textured feeling with a smooth feeling of the surface of the fruit 401. Further, in order to express the slightly textured feeling of the surface of the fruit 401, the vibration pattern P1 is set such that the amplitude values fluctuate.

For such reasons, the vibration pattern P1 is set to have the amplitude values A50±3. The amplitude values A50±3 mean that the center of the fluctuation is A50 that is the half of the amplitude value A100, and the width of the fluctuation is 3/50 of A50 in the positive direction and in the negative directions.

Hence, when the user's fingertip has reached the point C at time t3, the amplitude decreases and the kinetic friction force applied to user's fingertip increases. Therefore, the user obtains a tactile sensation as if the user were touching a convex portion through the user's fingertip.

Because the touch feeling of the leaf 402 is smoother than that of the fruit 401, the user sets the amplitude values A50±3 of the vibration pattern P1 allocated to the fruit 401 to be less than the amplitude value A100 of the vibration pattern P2 allocated to the leaf 402.

Subsequently, until reaching the point D, the vibration according to the vibration pattern P1 is generated in the top panel 120. Therefore, the user can feel, through his or her fingertip, the smoothness and the textured feeling of the surface of the fruit 401 of the peach with the tactile sensation.

When the user's fingertip has reached the point D at time t4, because the point D is boundary between the fruit 401 and points other than the fruits 401 and the leaves 402, the driving according to the vibration pattern P1 is completed at a point of time of having passed the point D, and the amplitude becomes zero.

Subsequently, the user separates his or her finger from the top panel 120 at a point of time when the user's fingertip reaches the point E at time 5.

As described above, the user can set, to the desired image 400, tactile sensations according to the desired vibration patterns P1 and P2.

Then, when the user touches the image 400 after the setting, the vibrations, according to the desired vibration patterns P1 and P2 set by the user, are generated in the top panel 120 in accordance with positions touching the image 400.

That is, according to the drive controlling apparatus 300 of the second embodiment, it is possible to freely set the vibration patterns P1 and P2 desired by the user to the desired image 400.

Figure 29:
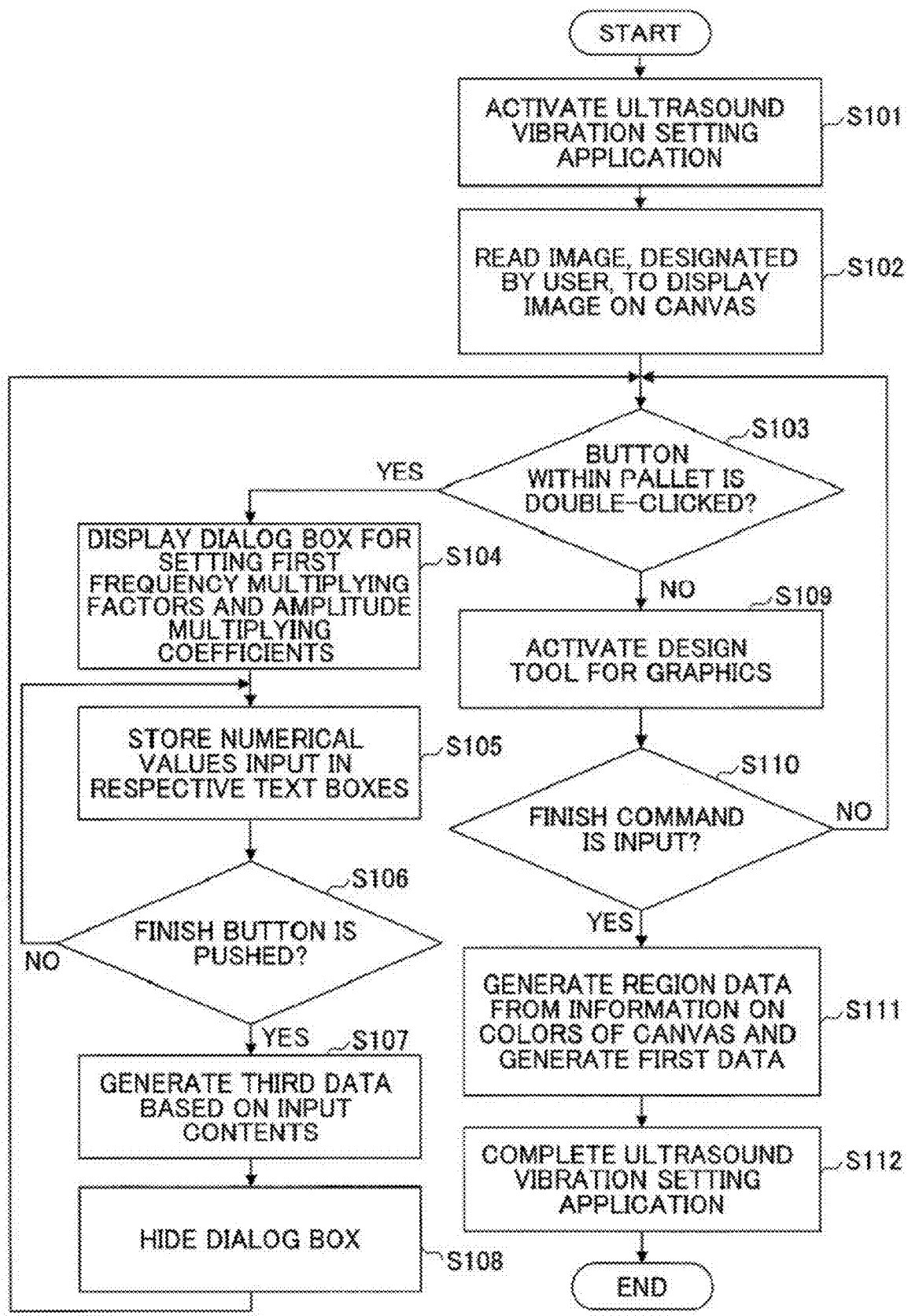
FIG. 29 is a flowchart illustrating processing that is executed by the data generating part of the drive controlling apparatus when the user uses an ultrasound vibration setting application to set ultrasound vibrations to an image.

FIG. 29 is a flowchart illustrating processing that is executed by the data generating part 240D of the drive controlling apparatus 300 when the user uses the ultrasound vibration setting application to set ultrasound vibrations to an image.

When the ultrasound vibration setting application is selected by a manipulation input by the user, the data generating part 240D starts the processing.

First, the data generating part 240D activates the ultrasound vibration setting application in step S101. Thereby, the user becomes able to display the desired image 400 (see FIG. 26) on the display panel 160.

Next, in step S102, the data generating part 240D recognizes the image 400, selected by the user, to display the image 400 on the canvas 400A, and displays the pallet 403 below the canvas 400A.

Next, the data generating part 240D determines whether the button 403A or the button 403B inside the pallet 403 is double-clicked in step S103. Here, the double-click of the button 403A or 403B is a command to display the dialog box 161 for setting first frequency multiplying factors and amplitude multiplying coefficients.

Upon determining that the button 403A or the button 403B is double-clicked (YES in step S103), the data generating part 240D displays the dialog box 161 on the display panel 160 in step S104. In this way, the user becomes able to set amplitude multiplying coefficients to the text boxes in the dialog box 161.

Next, the data generating part 240D stores, in the memory 250, the numerical values input in the respective text boxes in step S105.

Next, the data generating part 240D determines whether the finish button 161C is pushed in step S106.

Upon determining that the finish button 161C is pushed (YES in step S106), the data generating part 240D generates in step S107 third data based on the amplitude multiplying coefficients input in the text boxes in step S105. Note that when determining that the finish button 161C is not pushed (NO in step S106), the data generating part 240D returns the flow to step S105.

Upon completing the process of step S107, the data generating part 240D hides the dialog box 161 in step S108. Upon completing the process of step S108, the data generating part 240D returns the flow to step S103.

Upon determining that the button 403A or the button 403B inside the pallet 403 is not double-clicked (NO in step S103), the data generating part 240D causes the flow to go to step S109.

The data generating part 240D activates the design tool for graphics in step S109. In this way, the user becomes able to freely paint the canvas 400A.

For example, in FIG. 27, when a region to be painted on the canvas 400A is designated after single-clicking the button 403A, the designated region is painted in the dark grey. When a region to be painted on the canvas 400A is designated after single-clicking the button 403B displayed in the light grey, the designated region is painted in the light grey.

The data generating part 240D sets the vibration pattern P1 to the region(s) painted in the dark grey, and sets the vibration pattern P2 to the region(s) painted in the light grey.

The data generating part 240D determines whether a finish command is input in step S110. The finish command may be any preset command. For example, an operation of double-clicking a region other than the canvas 400A and the pallet 403 may be set as the finish command of the design tool for graphics.

Upon determining that the finish command is input (YES in step S110), based on the data on the colors painted on the canvas 400A, the data generating part 240D generates region data that represents coordinates of the regions painted in the dark grey and the light grey, and further generates first data based on the region data and the vibration patterns in step S111.

Upon determining the first data in step S111, the data generating part 240D completes the ultrasound vibration setting application in step S112.

As described above, the processing of executing the ultrasound vibration setting application by the data generating part 240D is completed (END).

Note that upon determining that the finish command is not input (NO in step S110), the data generating part 240D returns the flow to step S103.

By using the first data and the third data, set as described above, and the second data stored in advance in the memory 250, ultrasound vibrations that represents tactile sensations desired by the user can be generated when the user's fingertip touches the image of the fruits 401 and the leaves 402 illustrated in FIG. 26.

Further, as described with reference to FIG. 25 to FIG. 29, the drive controlling apparatus 300 of the second embodiment can freely set, to the desired image 400, the vibration patterns P1 and P2 desired by the user.

Accordingly, it is possible to provide the drive controlling apparatus 300 and the electronic device 100 of very high usefulness values to the user.

Although examples of a drive controlling apparatus, an electronic device, a drive controlling program, and a drive controlling method according to the embodiments of the present invention have been described above, the present invention is not limited to the embodiments specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A drive controlling apparatus for driving a vibrating element of an electronic device, the electronic device including a display part; a top panel disposed on a display surface side of the display part, the top panel having a manipulation input surface; a coordinate detector configured to detect coordinates of a manipulation input performed on the manipulation input surface; and the vibrating element, which is configured to vibrate the manipulation input surface, the drive controlling apparatus comprising:
   a data storage part configured to store basic waveform data that represents a basic waveform that represents a time change of amplitude of a driving signal for generating a natural vibration in an ultrasound frequency band in the manipulation input surface, a predetermined number of amplitude values arranged in a time series manner constituting the basic waveform;
   a waveform generating part configured to generate first waveform data that represents a first waveform obtained by changing a basic frequency or the amplitude values of the basic waveform;
   a waveform combining unit configured to generate first combined waveform data that represents a first combined waveform obtained by combining the basic waveform and the first waveform or by combining a plurality of first waveforms generated by the waveform generating part; and
   a drive controlling part configured to drive the vibrating element by changing the amplitude of the driving signal based on the first combined waveform data.

2. The drive controlling apparatus according to claim 1, wherein the waveform generating part decreases, in accordance with a ratio of a first frequency of the first waveform to the basic frequency, a number of data points of the basic waveform data to generate the first waveform data that represents the first waveform, the first waveform having the first frequency that is higher than the basic frequency of the basic waveform.

3. The drive controlling apparatus according to claim 1, wherein the drive controlling part decreases, in accordance with a degree of time change of a position of the manipulation input performed on the manipulation input surface, a number of data points of the first combined waveform data to generate second combined waveform data that represents a second combined waveform having a third frequency higher than a second frequency of the first combined waveform, and
   wherein the drive controlling part drives the vibrating element by using the second combined waveform data to change the amplitude of the driving signal.

4. The drive controlling apparatus according to claim 3, wherein the drive controlling part generates the second combined waveform data, by using a ratio n of the degree of time change of the position of the manipulation input to a basic value of the degree of time change of the position of the manipulation input to make the number of data points of the first combined waveform data a number obtained by dividing 1 by $m^n$ where m is a natural number that is greater than or equal to 2 or a decimal number that is greater than or equal to 1, and n is a natural number that is greater than or equal to 0.

5. The drive controlling apparatus according to claim 1, wherein the waveform generating part decreases, in accordance with a degree of time change of a position of the manipulation input performed on the manipulation input surface, a number of data points of the basic wave form data to generate the first waveform data that represents the first waveform, the first waveform a first frequency that is higher than the basic frequency of the basic waveform.

6. The drive controlling apparatus according to claim 5, wherein the waveform generating part generates the first combined waveform data, by using a ratio n of the degree of time change of the position of the manipulation input to a basic value of the degree of time change of the position of the manipulation input to make the number of data points of the basic waveform data a number obtained by dividing 1 by $m^n$ where m is a natural number that is greater than or equal to 2 or a decimal number that is greater than or equal to 1, and n is a natural number that is greater than or equal to 0.

7. The drive controlling apparatus according to claim 1, wherein the drive controlling part further changes the amplitude of the driving signal in accordance with a contact load of the manipulation input.

8. The drive controlling apparatus according to claim 1, wherein the data storage part further stores sub-basic waveform data that represents a sub-basic waveform, a number of data points of the sub-basic waveform being 1/X of the number of data points of the basic waveform data, a frequency of the sub-basic waveform being X-fold of the frequency of the basic waveform, where X is a decimal number,
   wherein the waveform generating part further generates first sub-waveform data that represents a first sub-waveform obtained by changing the frequency or amplitude values of the sub-basic waveform, and
   wherein the waveform combining part generates the first combined waveform, represented by the first combined waveform data, by combining the basic waveform, the first waveform, the sub-basic waveform, and the first sub-waveform or by combining a plurality of first waveforms and a plurality of first sub-waveforms generated by the waveform generating part.

9. The drive controlling apparatus according to claim 1, wherein the driving signal is a driving signal for generating, in the manipulation input surface, the natural vibration in the ultrasound frequency band at a constant frequency and a constant phase.

10. The drive controlling apparatus according to claim 1, wherein the manipulation input surface has a rectangular shape having long sides and short sides in plan view, and
    wherein the drive controlling part vibrates the vibrating element to generate a standing wave of which amplitude varies along a direction parallel to the long sides or the short sides of the manipulation input surface.

11. The drive controlling apparatus according to claim 1, wherein the drive controlling part estimates a position of the manipulation input after a lapse of a predetermined duration of time based on a degree of time change of the position of the manipulation input, and
    wherein the drive controlling part drives the vibrating element so that an intensity of the natural vibration varies in accordance with the estimated position of the manipulation input.

12. The drive controlling apparatus according to claim 1, further comprising:
    a data generating unit configured to generate, when a change amount for changing the frequency or the amplitude values of the basic waveform is input by the manipulation input performed on the manipulation input surface, data that represents the change amount to store the data in the data storage part, wherein the waveform generating part generates the first waveform data that represents the first waveform obtained by changing the frequency or the amplitude values of the basic waveform based on the data, which represents the change amount, stored in the data storage part.

13. An electronic device comprising:

the drive controlling apparatus according to claim 1;

the display part;

the top panel disposed on the display surface side of the display part, the top panel having the manipulation input surface;

the coordinate detector configured to detect the coordinates of the manipulation input performed on the manipulation input surface; and the vibrating element configured to vibrate the manipulation input surface.

14. A computer-readable recording medium having stored therein a drive controlling program for driving a vibrating element of an electronic device, the electronic device including a display part; a top panel disposed on a display surface side of the display part, the top panel having a manipulation input surface; a coordinate detector configured to detect coordinates of a manipulation input performed on the manipulation input surface; and the vibrating element, which is configured to vibrate the manipulation input surface, the drive controlling program causing a computer including a data storage part to execute processing, the data storage part storing basic waveform data that represents a basic waveform that represents a time change of amplitude of a driving signal for generating a natural vibration in an ultrasound frequency band in the manipulation input surface, a predetermined number of amplitude values arranged in a time series manner constituting the basic waveform, the processing comprising:

storing, when a change amount for changing a frequency or the amplitude values of the basic waveform is input by the manipulation input performed on the manipulation input surface, data that represents the change amount in the data storage part;

generating a first waveform data that represents a first waveform obtained by changing the frequency or the amplitude values of the basic waveform based on the data, which represents the change amount, stored in the data storage part;

generating first combined waveform data that represents a first combined waveform obtained by combining the basic waveform and the first waveform or by combining a plurality of first waveforms generated; and driving the vibrating element through a vibration pattern of changing the amplitude of the driving signal based on the first combined waveform data.

15. The computer-readable recording medium according to claim 14, wherein the processing includes creating, in a state in which an image is displayed on the display part, when a region corresponding to a part of the image is designated by the manipulation input performed on the manipulation input surface, data that represents the region based on the coordinates of the manipulation input detected by the coordinate detector;

associating, when the vibration pattern to be associated with the region is designated by the manipulation input performed on the manipulation input surface, the data that represents the region with data that represents the vibration pattern; and changing, when the manipulation input onto the manipulation input surface is performed inside the region in the state in which the image is displayed on the display part, the amplitude of the driving signal through the vibration pattern associated with the data that represents the region.

16. A drive controlling method for driving a vibrating element of an electronic device, the electronic device including a display part; a top panel disposed on a display surface side of the display part, the top panel having a manipulation input surface; a coordinate detector configured to detect coordinates of a manipulation input performed on the manipulation input surface; and the vibrating element, which is configured to vibrate the manipulation input surface, the drive controlling method being executed by a computer including a data storage part, the data storage part storing basic waveform data that represents a basic waveform that represents a time change of amplitude of a driving signal for generating a natural vibration in an ultrasound frequency band in the manipulation input surface, a predetermined number of amplitude values arranged in a time series manner constituting the basic waveform, the drive controlling method comprising:

generating first waveform data that represents a first waveform obtained by changing a frequency or the amplitude values of the basic waveform;

generating first combined waveform data that represents a first combined waveform obtained by combining the basic waveform and the first waveform or by combining a plurality of first waveforms generated; and driving the vibrating element by changing the amplitude of the driving signal based on the first combined waveform data.

* * * * *